US012602335B2

(12) United States Patent
O'Connor et al.

(10) Patent No.: US 12,602,335 B2
(45) Date of Patent: Apr. 14, 2026

(54) MEMORY INTERFACE WITH REDUCED ENERGY TRANSMIT MODE

(71) Applicant: NVIDIA Corp., Santa Clara, CA (US)

(72) Inventors: James Michael O'Connor, Austin, TX (US); Donghyuk Lee, Cedar Park, TX (US)

(73) Assignee: NVIDIA Corp., Santa Clara, CA (US)

( * ) Notice: Subject to any disclaimer, the term of this patent is extended or adjusted under 35 U.S.C. 154(b) by 903 days.

(21) Appl. No.: 17/668,226

(22) Filed: Feb. 9, 2022

(65) Prior Publication Data

US 2023/0043152 A1 Feb. 9, 2023

Related U.S. Application Data

(60) Provisional application No. 63/227,881, filed on Jul. 30, 2021.

(51) Int. Cl.
*G06F 13/36* (2006.01)
*G06F 13/16* (2006.01)
*G06T 1/20* (2006.01)
*G06T 1/60* (2006.01)

(52) U.S. Cl.
CPC ...... *G06F 13/1673* (2013.01); *G06F 13/1689* (2013.01); *G06T 1/20* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 10,424,074 B1 | 9/2019 | Uralsky et al. | |
| 10,491,238 B2 | 11/2019 | Sudhakaran et al. | |
| 10,581,645 B1 | 3/2020 | Song et al. | |
| 10,657,306 B1 | 5/2020 | Ma et al. | |
| 10,699,427 B2 | 6/2020 | Uralsky et al. | |
| 2002/0129381 A1* | 9/2002 | Barone, Jr. ............ | H04N 5/445 |
| | | | 725/136 |
| 2013/0130687 A1* | 5/2013 | Kumar Reddy .... | H04W 36/304 |
| | | | 455/67.11 |
| 2016/0183268 A1* | 6/2016 | Albano ............... | H04L 12/2801 |
| | | | 370/252 |
| 2016/0285721 A1* | 9/2016 | Lida .................... | H04L 25/0276 |
| 2019/0229749 A1* | 7/2019 | Sudhakaran ............ | H03M 7/46 |

(Continued)

OTHER PUBLICATIONS

"More is Less: Improving the Energy Efficiency of Data Movement via Opportunistic Use of Sparse Codes," in Proceedings of the International Symposium on Microarchitecture (MICRO), Dec. 2015. Y. Song and E. Ipek.

(Continued)

*Primary Examiner* — Henry Tsai
*Assistant Examiner* — Dean Phan
(74) *Attorney, Agent, or Firm* — Carnelian Law, LLC

(57) ABSTRACT

PAM encoding techniques that leverage unused idle periods in channels between data transmissions to apply longer but more energy-efficient codes. To improve energy savings, multiple sparse encoding schemes may be utilized selectively to fit different sized gaps in the traffic. These approaches may provide energy reductions, for example with memory READ and WRITE traffic, when transferring 4-bit data using 3-symbol sequences.

22 Claims, 14 Drawing Sheets

(56) References Cited

U.S. PATENT DOCUMENTS

| 2019/0304055 | A1  | 10/2019 | Vembu et al. |
| 2019/0305995 | A1* | 10/2019 | Lee .......................... H04B 3/32 |
| 2020/0151289 | A1  | 5/2020  | Sikka et al. |
| 2020/0175392 | A1  | 6/2020  | Tang et al. |
| 2020/0177798 | A1  | 6/2020  | Parekh et al. |
| 2020/0210276 | A1  | 7/2020  | Sullivan et al. |
| 2020/0210805 | A1  | 7/2020  | Drozdowski et al. |
| 2021/0234618 | A1* | 7/2021  | Vera Villarroel ... H04L 25/4908 |

OTHER PUBLICATIONS

"Bus-Invert Coding for Low-Power I/O", IEEE Transactions on Very Large Scale Integration (VLSI) Systems, vol. 3, No. 1 , Mar. 1995.

* cited by examiner

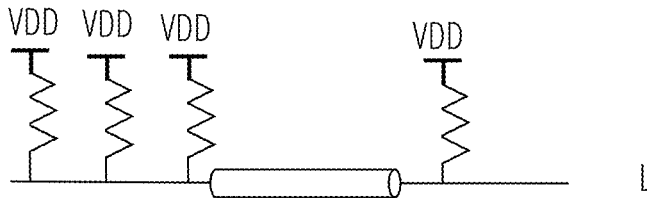
L0    FIG. 2A
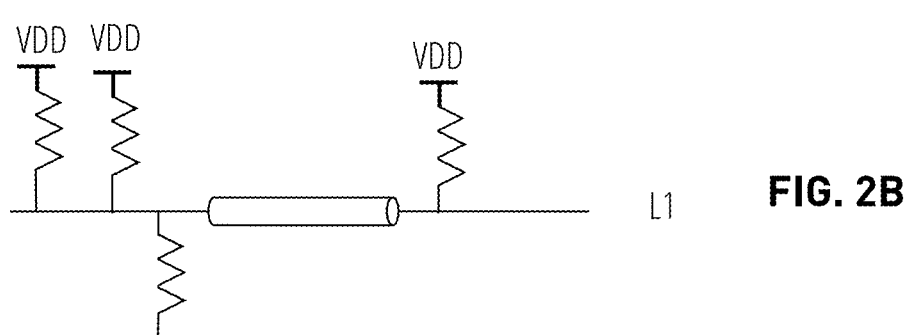
L1    FIG. 2B
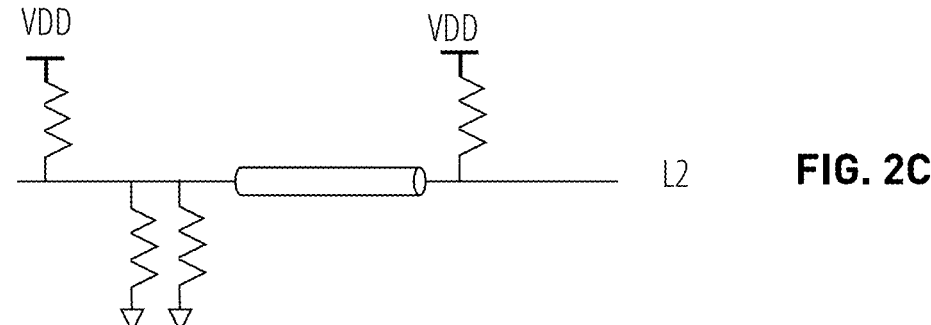
L2    FIG. 2C
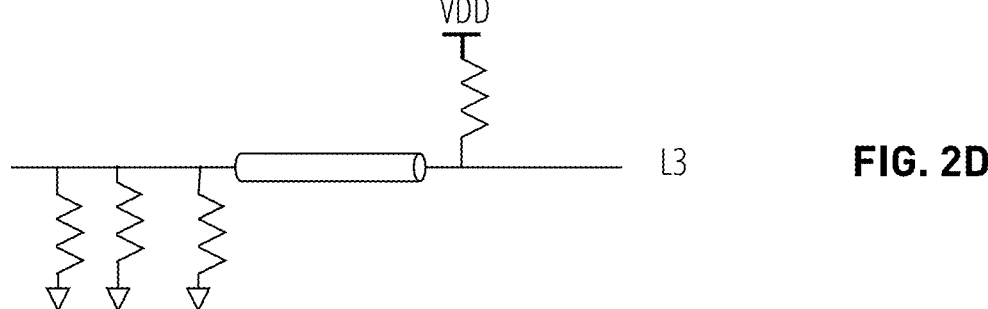
L3    FIG. 2D

Example 7 bit to 4 symbol MTA encoding.

| bits[3:7] | bits[2:0] | | | | | | | |
|---|---|---|---|---|---|---|---|---|
| | 000 | 001 | 010 | 011 | 100 | 101 | 110 | 111 |
| 0000 | 0000 | 0001 | 0010 | 0011 | 0100 | 0101 | 0110 | 0111 |
| 0001 | 2000 | 0002 | 0020 | 0022 | 0200 | 0202 | 0220 | 0222 |
| 0010 | 1000 | 1001 | 1010 | 1011 | 1100 | 1101 | 1110 | 1111 |
| 0011 | 2200 | 2001 | 2010 | 2011 | 2100 | 2101 | 2110 | 2111 |
| 0100 | 2020 | 2002 | 0012 | 0013 | 0021 | 0121 | 0211 | 2201 |
| 0101 | 0023 | 1002 | 1020 | 1022 | 1200 | 1202 | 1220 | 1222 |
| 0110 | 1021 | 0122 | 0212 | 1113 | 0221 | 1131 | 1311 | 1223 |
| 0111 | 0113 | 0223 | 0232 | 2113 | 2023 | 2131 | 2311 | 2312 |
| 1000 | 0210 | 0120 | 0102 | 0112 | 0201 | 1210 | 1012 | 2210 |
| 1001 | 1102 | 2012 | 2021 | 2022 | 2102 | 2202 | 2220 | 2213 |
| 1010 | 1120 | 0131 | 1013 | 1122 | 1310 | 1212 | 1221 | 1232 |
| 1011 | 1023 | 1123 | 1132 | 1133 | 1213 | 1313 | 1331 | 2321 |
| 1100 | 1201 | 0123 | 0132 | 2112 | 0213 | 2121 | 2211 | 2231 |
| 1101 | 1320 | 1231 | 1312 | 1322 | 1321 | 2123 | 2132 | 1233 |
| 1110 | 2120 | 1112 | 1121 | 2122 | 1211 | 2212 | 2221 | 1323 |
| 1111 | 0231 | 2013 | 2310 | 1332 | 0133 | 2331 | 0233 | 2320 |

FIG. 3

| Input | 3 Symbol | 4 Symbol | 6 Symbol | 8 Symbol |
|-------|----------|----------|----------|----------|
| 0000 | 000 | 0000 | 000000 | 00000000 |
| 0001 | 001 | 0001 | 000001 | 00000001 |
| 0010 | 010 | 0010 | 000010 | 00000010 |
| 0011 | 020 | 0002 | 010000 | 00010000 |
| 0100 | 100 | 0100 | 000100 | 00000100 |
| 0101 | 200 | 0020 | 100000 | 00100000 |
| 0110 | 011 | 0200 | 000002 | 01000000 |
| 0111 | 021 | 1100 | 020000 | 00000200 |
| 1000 | 002 | 1000 | 001000 | 00001000 |
| 1001 | 110 | 2000 | 000020 | 10000000 |
| 1010 | 101 | 0011 | 000200 | 00000002 |
| 1011 | 120 | 1001 | 200000 | 00002000 |
| 1100 | 012 | 0110 | 002000 | 00000020 |
| 1101 | 210 | 0101 | 000011 | 00020000 |
| 1110 | 102 | 1010 | 001100 | 00200000 |
| 1111 | 201 | 0012 | 110000 | 02000000 |

FIG. 6

| Code | Energy (fJ/bit) |
|---|---|
| 2-bit 1 symbols PAM-4 | 528.8 |
| 2-bit 1 symbols PAM-4 w/ DBI | 446.5 |
| 7-bit 4 symbols PAM-4 (MTA) | 574.8 |
| 7-bit 4 symbols PAM-4 (MTA/postamble) | 900.2 |
| 4-bit 3 symbols (3 level) | 448.4 |
| 4-bit 3 symbols (3 level/DBI) | 432.3 |
| 4-bit 4 symbols (3 level) | 382.5 |
| 4-bit 4 symbols (3 level/DBI) | 374.8 |
| 4-bit 6 symbols (3 level) | 331.8 |
| 4-bit 6 symbols (3 level/DBI) | 331.4 |
| 4-bit 8 symbols (3 level) | 319.8 |
| 4-bit 8 symbols (3 level/DBI) | 319.7 |

1000

TO/FROM XBAR 914

PIPELINE MANAGER 1002

PROP 1004

MPC 1010

PRIMITIVE ENGINE 1012

STREAMING MULTIPROCESSOR 1200

DPC 1

RASTER ENGINE 1008

WDX 1014

MMU 1016

TO/FROM XBAR 914

TO/FROM XBAR 914

1100

TO/FROM
XBAR 914

MEMORY PARTITION
UNIT 1100

ROP UNIT 1102

L2 CACHE 1104      TO/FROM
XBAR 914

MEMORY INTERFACE 1106

TO/FROM
MEMORY 912

1500

INPUT DATA
1502

DATA ASSEMBLY 1506

VERTEX SHADING 1508

PRIMITIVE ASSEMBLY 1510

GEOMETRY SHADING 1512

VIEWPORT SCC 1514

RASTERIZATION 1516

FRAGMENT SHADING 1518

RASTER OPERATIONS 1520

OUTPUT
DATA 1504

MEMORY INTERFACE WITH REDUCED ENERGY TRANSMIT MODE

CROSS-REFERENCE TO RELATED APPLICATIONS

This application claims priority and benefit under 35 USC 119(e) to U.S. Application Ser. No. 63/227,881, filed Jul. 30, 2021, titled "MEMORY INTERFACE WITH REDUCED ENERGY TRANSMIT MODE", the contents of which are incorporated herein by reference in their entirety.

BACKGROUND

Pulse Amplitude Modulation (PAM) uses multiple voltage levels to represent different data symbols on a communication bus, transferring multiple bits of data simultaneously, thereby enabling higher communication bandwidth without increased operating frequencies. However, dividing the voltage into more symbols leads to a smaller voltage difference between adjacent symbols, making the interface more vulnerable to crosstalk and power noise. Conventional PAM coding approaches may consume excess energy and produce excess power noise.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 1A depicts an example of PAM-2 symbols 100a.

FIG. 2A depicts a line driver for PAM-4 symbol L0 in accordance with one embodiment.

FIG. 2B depicts a line driver for PAM-4 symbol L1 in accordance with one embodiment.

FIG. 2C depicts a line driver for PAM-4 symbol L2 in accordance with one embodiment.

FIG. 2D depicts a line driver for PAM-4 symbol L3 in accordance with one embodiment.

FIG. 3 data bit partitioning with maximum transition avoidance (MTA), in accordance with one embodiment.

FIG. 6 depicts encoding logic in accordance with one embodiment.

DETAILED DESCRIPTION

Figure 1A:
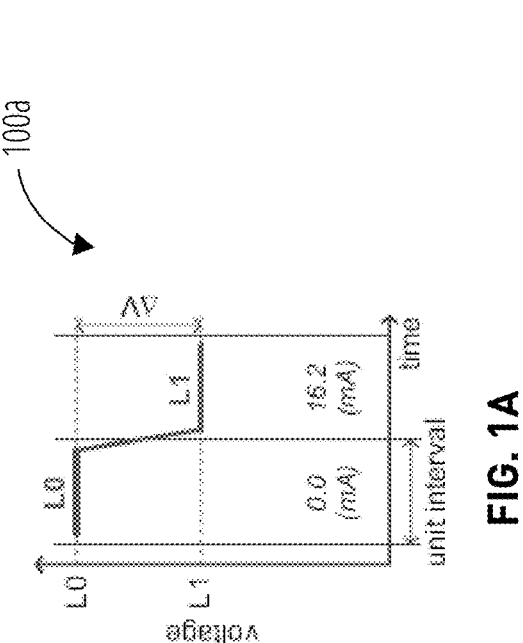

Embodiments of energy reduction techniques for PAM communications on single-ended serial links are herein disclosed. Unused idle periods in channels between data transmissions are exploited to apply longer but more energy-efficient codes. To maximize the energy savings, a multi-modal sparse encoding methodology may be utilized to dynamically fit the applied encoding to different sized gaps in the traffic. This may result in substantial (e.g., >20%) energy reductions for the communication of 4-bit data using 3-symbol sequences. An encoding of a sequence of N bits into symbols is "sparse" if the number of symbols utilized for the bit sequence is more than needed to optimally encode N bits. Thus, the sparsity of an encoding is a function of both the number of symbols used to encode the bit sequence and the number of voltage levels utilized in the symbols.

For example, in PAM-4 embodiments, longer, energy efficient sparse encodings may be opportunistically applied during idle gaps on a serial data bus, with the constraint that $3\Delta V$ transitions between symbols are avoided, while mitigating any performance loss.

On some computing platforms, the most common clock gap occurring on the bus is one clock interval long. This places a constraint on the techniques that may be utilized when generating longer, sparse symbol codes comprising the least energy symbols.

In PAM-4 signaling, there are four different voltage levels available to encode each symbol. Each symbol can thus encode 2-bits of data. The transfer of 4-bits requires two symbols, and there are 16 possible ways to encode the 4-bits into those two symbols. Four such sequences having the lowest energy consumption are L0L0, L0L1, L1L0, and L2L0.

The current pull (energy difference) between L0 and L1 (e.g., 9.4 mA) is larger than the difference between L1 and L2 (e.g., 6:6 mA). This makes the symbol sequence L2L0 (or L0L2) more energy efficient to transmit than the sequence L1L1.

The number of data bits that are input to the encoder is one design parameter to consider. For example, inputting more bits to encode simultaneously may enable more energy efficient codes. However, the overhead of the lookup table (that may be implemented with synthesized logic gates) increases significantly with longer input code lengths. In one embodiment, coding schemes that encode 4-bits at once are utilized, providing the bulk of the benefits of longer bit sequence encoders, while consuming relatively smaller circuit area and energy overhead for the encoder.

Another design parameter is the resulting code length after encoding. This is the number of symbols that will be sent on the data line to represent the input bit sequence. For example, an output code length of four symbols means the data sequence will be encoded and communicated as four PAM-4 symbols. The output code length determines the bandwidth overhead of the code. A longer sparse code may provide increased energy efficiency but may be applied less often, as fewer communication scenarios will comprise a sufficient gap interval on the data line to accommodate the code without introducing a performance penalty.

Another parameter is how many voltage levels are utilized for the sparse code symbols. For example, if the output sparse code utilizes only the L0 and L1 symbols, this may be referred to as a 2-level encoding in PAM-4 (because the voltage levels of the symbols themselves are those of a PAM-4 driver, but only two of the four PAM-4 symbols are used in practice). An N level encoding in PAM-4 means that the sparse code utilizes the N<4 PAM-4 symbols drawing the lowest energy from the data line. By utilizing either 2-level or 3-level encoding in PAM-4 for output sparse codes, the maximum transition between symbols is limited to be 1ΔV or 2ΔV, respectively. Therefore, because the maximum transition of PAM-4 (3ΔV) is fundamentally avoided, such sparse encoding schemes do not require any transition limiting mechanism such as MTA.

Combining the output code length and utilized level count determines the code space of the generated sparse code. For example, if the output code length is four symbols and the utilized level count is three, the number of different symbol sequences, the code space, is $3^4$=81. If we have an input code length of 4-bits, a code is selected which takes the sixteen lowest energy sequences from the 81 possible output combinations. We call this a 4-bit to 4-symbol, 3-level (4b4s31) code. FIG. 6 depicts the encodings for four different 4-bit input, 3-level codes of various code lengths (4b3s31, 4b4s31, 4b6s31, and 4b8s31).

Sparse encodings of 2-level or 3-level symbols achieve MTA without utilizing the DBI line. To further reduce energy consumption, the DBI line may be utilized in addition to sparse encoding. For example, the DBI line may be utilized to communicate portions of eight data bit sequences that are simultaneously transferred over eight data lines.

In one embodiment, a sparse encoding is applied to an input bit sequence along with a DBI mechanism. The DBI may be applied on a 3-level sparse code using a level-swap technique. If any symbol is represented on a majority of the data lines during a burst, and it is not the minimum energy symbol L0, then it is swapped with L0. The DBI signal specifies whether L0 was swapped for L1 or L2 (or neither). This mechanism may be utilized for example with for 2-level or 3-level codes. In the following algorithm, NL refers to the number of symbols of a given level on M data lines. For example, when M=8, NL1 refers to the number of L1 symbols being communicated on eight data lines in a given burst.

Swap L0 and L1 and set DBI=L1, if NL1>M/2
Swap L0 and L2 and set DBI=L2, if NL2>M/2
Otherwise, DBI=L0

A 2-level or 3-level code does not ever have 3ΔV transitions among its own symbols. However, a situation may occur whereby the immediately preceding code concluded with a L3 symbol, and the current code starts with an L0 symbol. This situation will result in a noisy 3ΔV transition on the data lane. In one embodiment the encoder inverts the entire code on condition that the previous symbol ended on a L3. This does not significantly impact the energy efficiency of encoding mechanism.

For sparse codes, inverting a code in this manner is impractical, because in practice, a large number of minimum energy L0 symbols may be converted to energy-expensive L3 symbols. Rather than inverting the code, the sparse codes may utilize a level shifting policy. If the previous symbol on the bus is an L3, then the next symbol is transmitted at a level that is one higher than it otherwise would have been. Thus, if an L3 symbol would have been followed by a problematic L0 symbol, it instead is followed by a level-shifted L1 symbol. If the next symbol after an L3 symbols is an L2 symbol, then the symbol is level shifted on the data lane to a L3. In this latter case, the symbol following the L2 that was promoted to an L3 will also be subject to level shifting, and so forth.

The level shifting is applied after DBI has been applied. The receiver subtracts one level from any symbol received after an L3 symbol, and then applies the DBI-specified level swap, if necessary. This approach is effective at avoiding any 3ΔV transitions on the seams between an MTA encoded burst and sparse-coded burst.

FIG. 1A depicts an example of PAM-2 symbols 100a. It is common for high-speed interfaces to couple each data wire to the VDD supply voltage through a termination resistor. Thus, one symbol is at the VDD level and another symbol at a voltage level determined by the ratio between the termination resistance and the "on" resistance of the driver. Due to this termination scheme, the interface draws current and consumes more energy while transferring lower voltage symbols than when transferring higher-voltage symbols. To enable higher bandwidth with the same clock frequency, systems can introduce more levels in the PAM I/O interface.

Figure 1B:
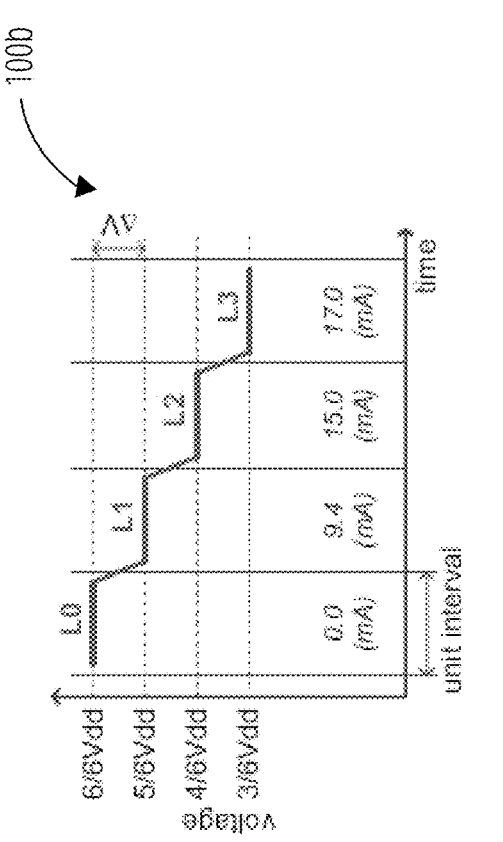
FIG. 1B depicts an example of PAM-4 symbols 100b.

FIG. 1B depicts an example of PAM-4 symbols 100b, with four different voltage levels encoding two bits per symbol. This approach provides twice the bandwidth of PAM-2 when operating at the same frequency.

FIG. 2A-FIG. 2D depict line driver embodiments for PAM-4 symbols L0, L1, L2, and L3. The different voltage levels for the different symbols are generated by combining resistances in different ways at the input to the serial data line. To deliver a lower voltage symbol, more drivers are enabled inducing a higher current flow. The resistance column in Table 1 shows examples of PAM-4 symbols and their corresponding voltage and current drain on the serial line.

As a result of the differing current draw, the different symbols have the different energy consumptions. In Table 1, L0 has the lowest energy consumption and L3 has the highest energy consumption L3. As Table 1 demonstrates, PAM-4 signaling may introduce some practical challenges, such as being more vulnerable to power noise and crosstalk from activity in adjacent data lines. For example using a 1.35V supply for VDD, the voltage difference between the PAM-4 symbols is only 225 mV. The reduced voltage difference between adjacent symbols, relative to PAM-2 signaling, means that smaller variations in the signal voltage can result in the wrong symbol being detected. These problems are most severe when symbols are transitioning between the maximum and minimum voltage levels, L0 and L3, or vice versa. These maximum transition swings induce the most noise in signals on neighboring data lines. The maximum transition swings also require the most rapid change in voltage, producing the most vulnerable periods for crosstalk.

TABLE 1

| Symbol | Current | Voltage |
|--------|---------|---------|
| L0 | 0 mA | VDD |
| L1 | 9.4 mA | 5/6 VDD |
| L2 | 15.0 mA | 2/3 VDD |
| L3 | 17.0 mA | 1/2 VDD |

FIG. 3 depicts 7-bit to 4-symbol MTA encoding logic in accordance with one embodiment (e.g., a 'codebook'). To address the issues caused by transitions between the highest and lowest voltage symbols, Maximum Transition Avoidance (MTA) encoding may be utilized. This technique encodes the data such that no $3\Delta V$ transitions from L0 to L3 or L3 to L0 ever occur on the data bus. The MTA encoding is based on the 139 possible 4-symbol sequences that start with L0, L1, or L2 and do not contain any $3\Delta V$ transitions. Of these 139 sequences, the highest energy 11 sequences are discarded leaving a set of 128 symbols. FIG. 3 depicts an example of an MTA encoding in accordance with these constraints.

Figure 4:
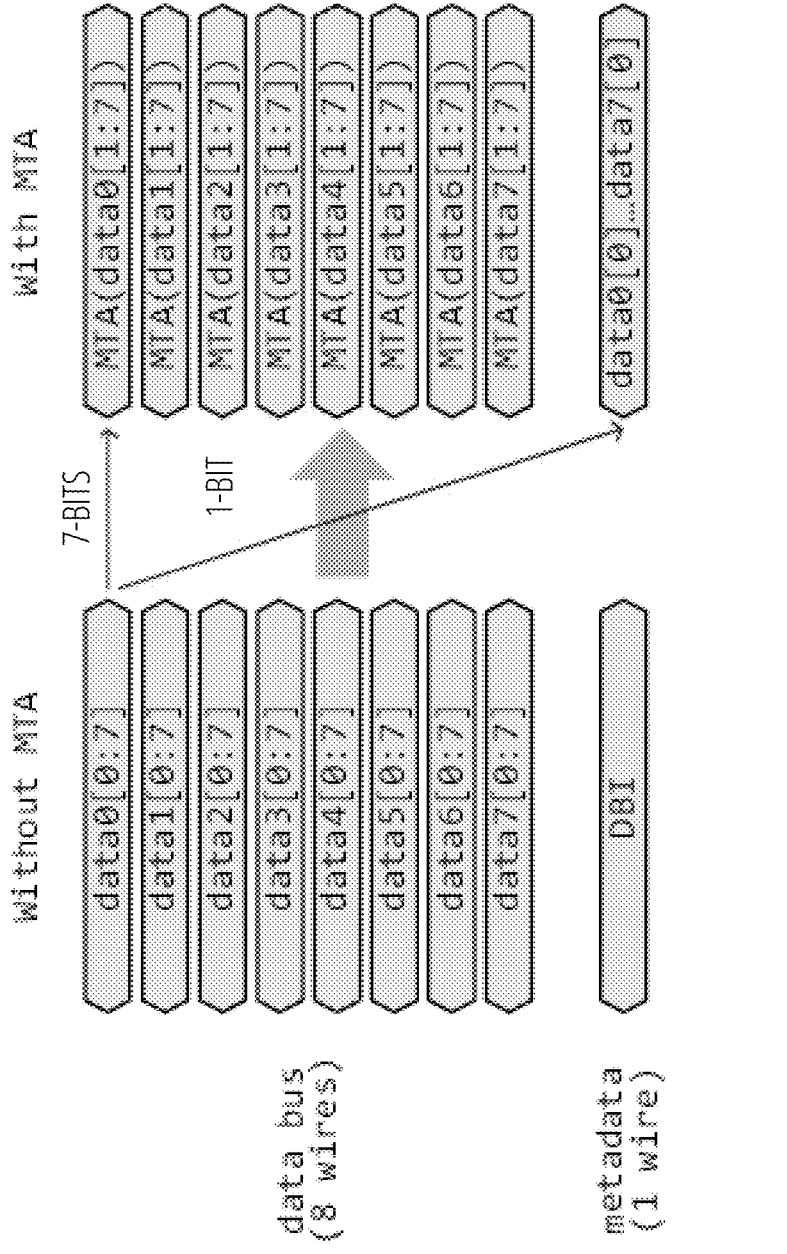
FIG. 4 depicts data mapping to serial lines with and without MTA, in accordance with one embodiment.

FIG. 4 depicts data allocation to serial data lines with and without MTA, in accordance with one embodiment. The MTA encoding process divides each 8-bit sequence that would be sent on a given data line into its most-significant 1-bit and the remaining 7-bits. The 7-bits are transformed into one of 128 4-symbol sequences (e.g., those in FIG. 3). This encoding is performed on groups of eight 8-bit signals. The remaining unencoded 1-bit from each of the eight signals are combined to form a 4-symbol PAM-4 sequence that is communicated in parallel with the encoded data on a ninth data line (DBI line). Because the data sent on this DBI wire is not MTA encoded, additional design constraints may be placed only on the DBI wire, for example, applying extra distance between the DBI wire and data wires or adding extra ground shielding wires.

The MTA encoding incorporates an additional enhancement to prevent $3\Delta V$ transitions between successive encoded 4-symbol sequences. While each of the 128 encoded sequences starts with an L0, L1, or L2 symbol, a sequence can end with an L3 symbol. As a result, an L3 to L0 transition may occur from one sequence to the next. To prevent this situation, whenever a symbol sequence ends with an L2 or L3 symbol, the next encoded symbol on that data lane will be sent inverted. An L0 symbol will be transmitted as L3, L1 as L2, L2 as L1, and L3 as L0. This inversion prevents the problematic $3\Delta V$ transition between successive symbols. Special processing is also invoked when there is no data to send after a data burst. A one clock interval "postamble" may be applied on an idle data line after a data burst. This postamble sets the bus at the L1 voltage, preventing $3\Delta V$ transitions at the end of a burst.

Figures 5A, 5B, 5C, 5D:
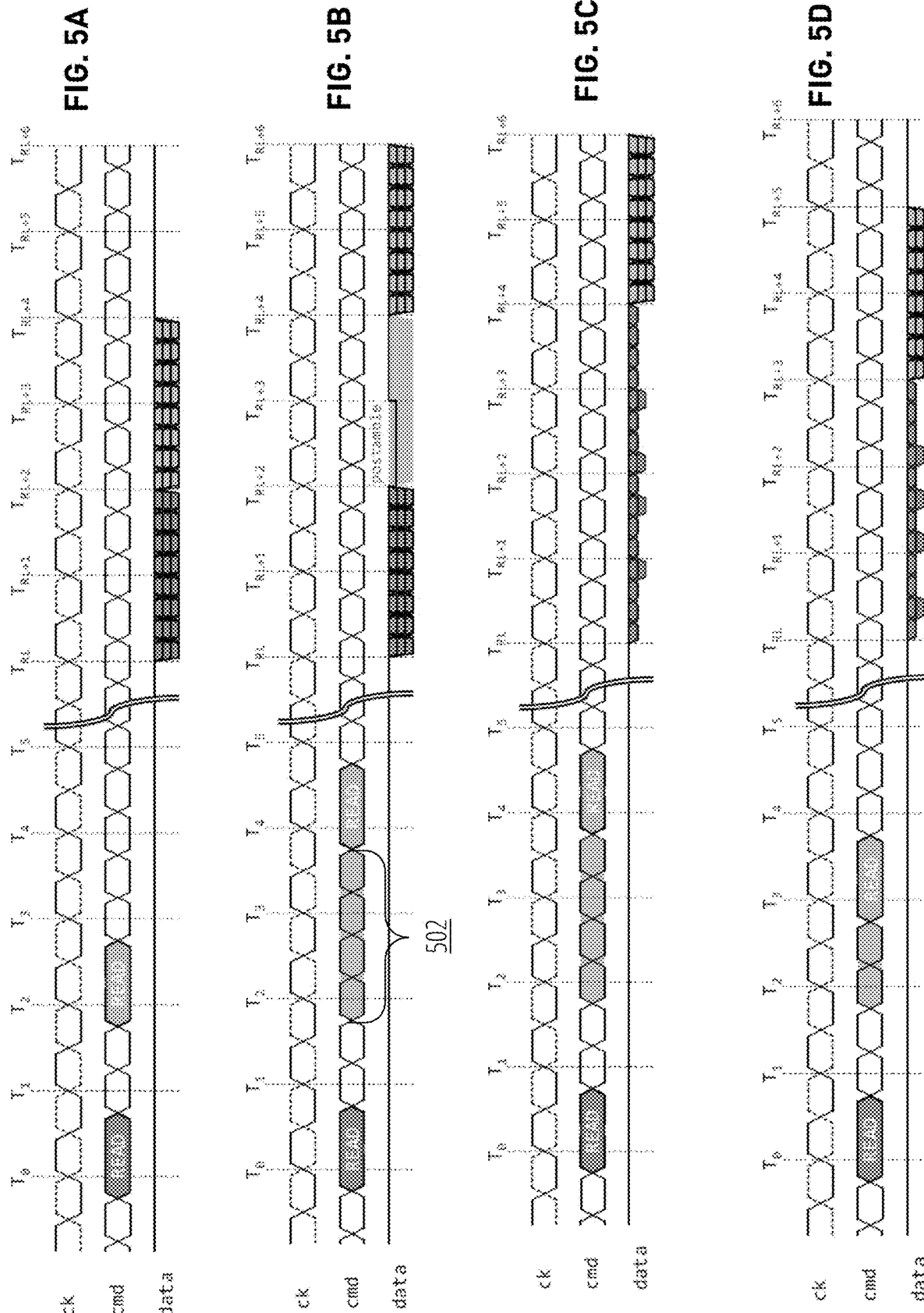
FIG. 5A depicts a gapless read operation in accordance with one embodiment.
FIG. 5B depicts a clock gap read in accordance with one embodiment.
FIG. 5C depicts a sparse encoding in accordance with one embodiment.
FIG. 5D depicts a sparse encoding in accordance with another embodiment.

FIG. 5A depicts an example of a gapless READ operation. Two READ commands are serviced by the memory. The commands and addresses are provided at each of clock cycles T0 and T2. Upon receiving the first READ command at cycle T0, the receiver decodes the command/address and brings the requested data from the corresponding cell array to the I/O interface (e.g., the line drivers). This takes an amount of time, RL, the read latency. Starting at cycle $T_{RL}$, the receiver begins to transfer the 256-bits of read data using PAM-4 over the data lanes. The data is transferred in a burst as eight symbols on each of sixteen serial data lanes (plus two DBI pins). The data is sent on both edges of a clock that cycles at twice the rate of the command clock.

Thus, the entire read data response is transferred back to the source of the READ command in the two cycles from $T_{RL}$ to $T_{RL}+2$. The READ command received at T2 transmits its data in the two subsequent cycles $T_{RL}+2$ to $T_{RL}+4$. If there are more than two clocks between successive READ commands, the additional gap results in idle cycles on the data bus. These idle cycles are referred to herein as gaps.

FIG. 5B depicts a two-clock-interval gap READ, with a one clock L1 postamble to avoid $3\Delta V$ transitions between an L3 symbol and an L0 (idle) symbol. Two READ commands sent at T0 and T4 respectively are separated by four clock intervals. This situation leads to a two-clock idle period (gap

502) on the data lane. After completing the first data transfer at $T_{RL}+2$, there is the one command clock postamble where the voltage corresponding to the L1 symbol is maintained on the data lane. This postamble prevents any $3\Delta V$ transitions from the final symbol (e.g., an L3) in a burst to an idle bus (L0 symbol). After the postamble, the bus reverts to the lowest-energy L0 symbol at $T_{RL}+3$.

FIG. 5C and FIG. 5D depict the dynamic utilization of different encoding mechanisms in different bus communication scenarios, e.g., different clock interval gaps. FIG. 5C depicts a two clock interval gap read, with a one clock L1 postamble to avoid $3\Delta V$ transitions between an L3 symbol and an L0 (idle) symbol. The embodiment in FIG. 5D is a 4-bit to 3-symbol encoding for a one clock interval gap, where the symbols each comprise one of three voltage levels (i.e., a (4b3s31 encoding).

FIG. 6 depicts the previously described encoding logic for various length 3-level sparse encodings of 4-bits, in accordance with one embodiment. As a matter of implementation, each column or combinations of columns may represent a distinct 'codebook' for PAM symbols communicated on a data bus, or the logic may be considered to represent one single 'codebook'. In practice, some or all the 'codebooks' may be stored in one or more associative memory (indexed for example by the 'input' sequence).

Figures 7, 8:
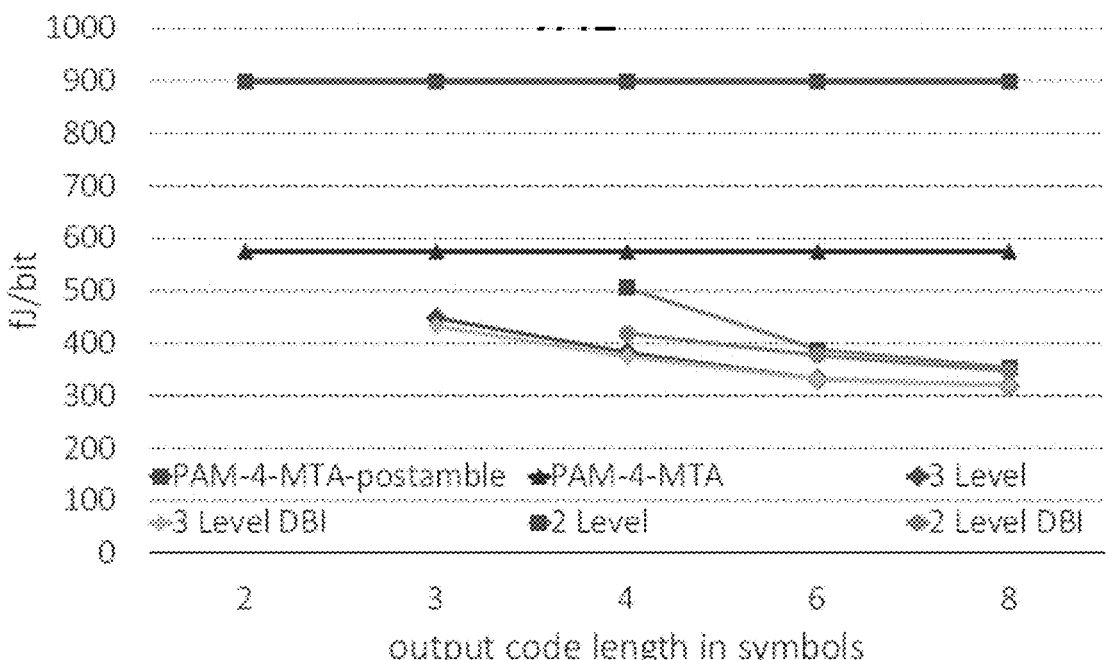
FIG. 7 depicts energy consumption for four-bit input codes in accordance with one embodiment.
FIG. 8 depicts energy consumption comparisons in accordance with one embodiment.

FIG. 7 depicts examples of energy consumption of different encoding mechanisms on 4-bit input sequences.

FIG. 8 depicts an example of energy consumption for baseline PAM-4 encoding compared with sparse encodings, in one embodiment.

Embodiments of the communication mechanisms disclosed herein may be implemented by computing devices utilizing one or more graphic processing unit (GPU) and/or general purpose data processor (e.g., a 'central processing unit or CPU). For example, embodiments of the encoding techniques and circuits to perform them described herein may be employed with communication between GPUs, and/or between parallel processing units in a system, between a GPU and a CPU, or between any of the above components and a memory device. Exemplary architectures will now be described that may be configured to carry out the techniques disclosed herein on such devices.

The following description may use certain acronyms and abbreviations as follows:

"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 9:
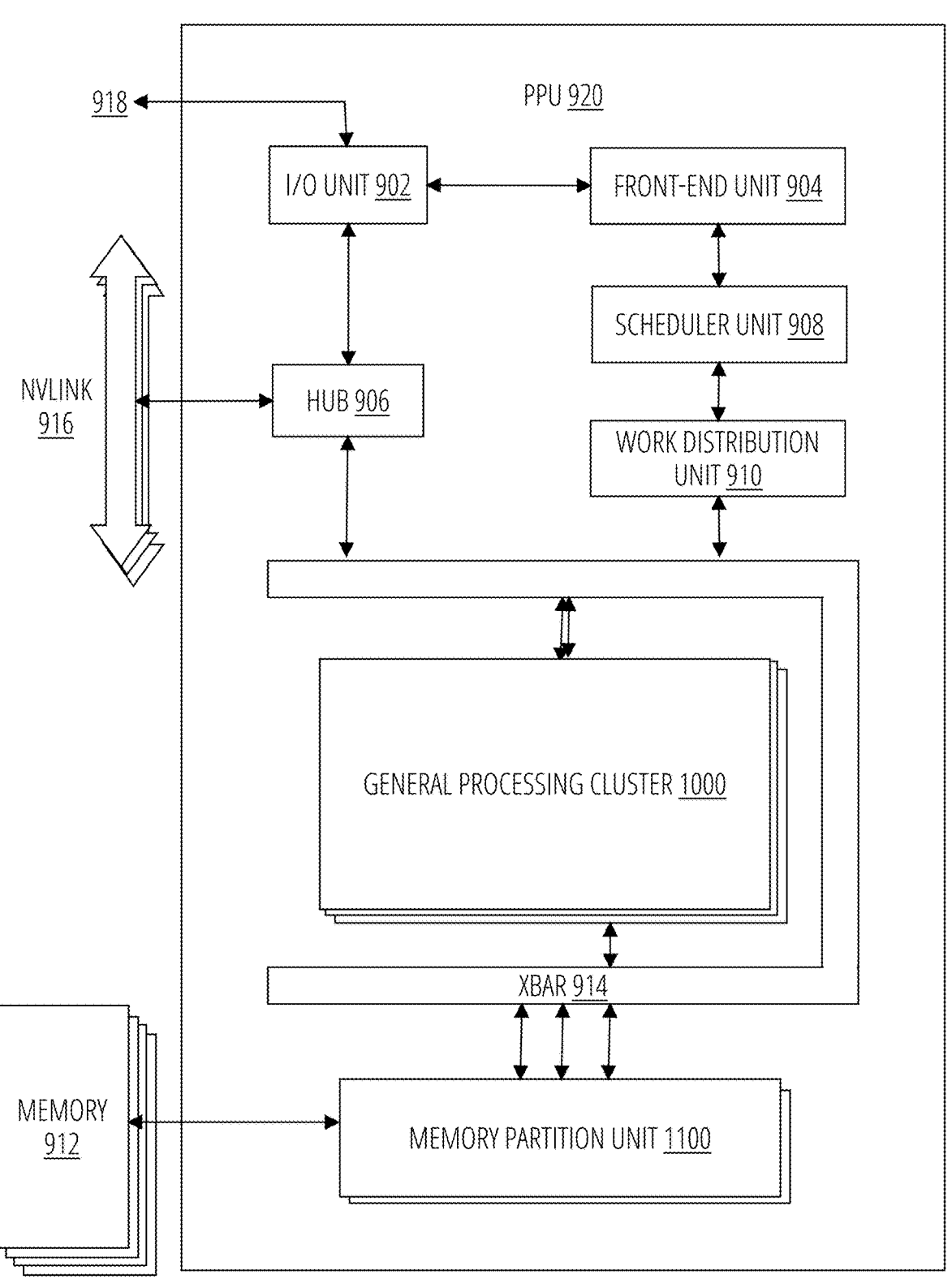
FIG. 9 depicts a parallel processing unit 920 in accordance with one embodiment.

FIG. 9 depicts a parallel processing unit 920, in accordance with an embodiment. In an embodiment, the parallel processing unit 920 is a multi-threaded processor that is implemented on one or more integrated circuit devices. The parallel processing unit 920 is a latency hiding architecture designed to process many threads in parallel. A thread (e.g., a thread of execution) is an instantiation of a set of instructions configured to be executed by the parallel processing unit 920. In an embodiment, the parallel processing unit 920 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 920 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 920 modules may be configured to accelerate thousands of High Performance Computing (HPC), data center, and machine learning applications. The parallel processing unit 920 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 9, the parallel processing unit 920 includes an I/O unit 902, a front-end unit 904, a scheduler unit 908, a work distribution unit 910, a hub 906, a crossbar 914, one or more general processing cluster 1000 modules, and one or more memory partition unit 1100 modules. The parallel processing unit 920 may be connected to a host processor or other parallel processing unit 920 modules via one or more high-speed NVLink 916 interconnects. The parallel processing unit 920 may be connected to a host processor or other peripheral devices via an interconnect 918. The parallel processing unit 920 may also be connected to a local memory comprising a number of memory 912 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 912 may comprise logic to configure the parallel processing unit 920 to carry out aspects of the techniques disclosed herein.

The NVLink 916 interconnect enables systems to scale and include one or more parallel processing unit 920 modules combined with one or more CPUs, supports cache coherence between the parallel processing unit 920 modules and CPUs, and CPU mastering. Data and/or commands may be transmitted by the NVLink 916 through the hub 906 to/from other units of the parallel processing unit 920 such as one or more copy engines, a video encoder, a video decoder, a power management unit, etc. (not explicitly shown). The NVLink 916 is described in more detail in conjunction with FIG. 13.

The I/O unit 902 is configured to transmit and receive communications (e.g., commands, data, etc.) from a host processor (not shown) over the interconnect 918. The I/O unit 902 may communicate with the host processor directly via the interconnect 918 or through one or more intermediate devices such as a memory bridge. In an embodiment, the I/O unit 902 may communicate with one or more other processors, such as one or more parallel processing unit 920 modules via the interconnect 918. In an embodiment, the I/O unit 902 implements a Peripheral Component Interconnect Express (PCIe) interface for communications over a PCIe bus and the interconnect 918 is a PCIe bus. In alternative embodiments, the I/O unit 902 may implement other types of well-known interfaces for communicating with external devices.

The I/O unit 902 decodes packets received via the interconnect 918. In an embodiment, the packets represent commands configured to cause the parallel processing unit 920 to perform various operations. The I/O unit 902 transmits the decoded commands to various other units of the parallel processing unit 920 as the commands may specify. For example, some commands may be transmitted to the front-end unit 904. Other commands may be transmitted to the hub 906 or other units of the parallel processing unit 920 such as one or more copy engines, a video encoder, a video decoder, a power management unit, etc. (not explicitly shown). In other words, the I/O unit 902 is configured to route communications between and among the various logical units of the parallel processing unit 920.

In an embodiment, a program executed by the host processor encodes a command stream in a buffer that provides workloads to the parallel processing unit 920 for processing. A workload may comprise several instructions and data to be processed by those instructions. The buffer is a region in a memory that is accessible (e.g., read/write) by both the host processor and the parallel processing unit 920. For example, the I/O unit 902 may be configured to access the buffer in a system memory connected to the interconnect 918 via memory requests transmitted over the interconnect 918. In an embodiment, the host processor writes the command stream to the buffer and then transmits a pointer to the start of the command stream to the parallel processing unit 920. The front-end unit 904 receives pointers to one or more command streams. The front-end unit 904 manages the one or more streams, reading commands from the streams and forwarding commands to the various units of the parallel processing unit 920.

The front-end unit 904 is coupled to a scheduler unit 908 that configures the various general processing cluster 1000 modules to process tasks defined by the one or more streams. The scheduler unit 908 is configured to track state information related to the various tasks managed by the scheduler unit 908. The state may indicate which general processing cluster 1000 a task is assigned to, whether the task is active or inactive, a priority level associated with the task, and so forth. The scheduler unit 908 manages the execution of a plurality of tasks on the one or more general processing cluster 1000 modules.

The scheduler unit 908 is coupled to a work distribution unit 910 that is configured to dispatch tasks for execution on the general processing cluster 1000 modules. The work distribution unit 910 may track a number of scheduled tasks received from the scheduler unit 908. In an embodiment, the work distribution unit 910 manages a pending task pool and an active task pool for each of the general processing cluster 1000 modules. The pending task pool may comprise a number of slots (e.g., 32 slots) that contain tasks assigned to be processed by a particular general processing cluster 1000. The active task pool may comprise a number of slots (e.g., 4 slots) for tasks that are actively being processed by the general processing cluster 1000 modules. As a general processing cluster 1000 finishes the execution of a task, that task is evicted from the active task pool for the general processing cluster 1000 and one of the other tasks from the pending task pool is selected and scheduled for execution on the general processing cluster 1000. If an active task has been idle on the general processing cluster 1000, such as while waiting for a data dependency to be resolved, then the active task may be evicted from the general processing cluster 1000 and returned to the pending task pool while another task in the pending task pool is selected and scheduled for execution on the general processing cluster 1000.

The work distribution unit 910 communicates with the one or more general processing cluster 1000 modules via crossbar 914. The crossbar 914 is an interconnect network that couples many of the units of the parallel processing unit 920 to other units of the parallel processing unit 920. For example, the crossbar 914 may be configured to couple the work distribution unit 910 to a particular general processing cluster 1000. Although not shown explicitly, one or more other units of the parallel processing unit 920 may also be connected to the crossbar 914 via the hub 906.

The tasks are managed by the scheduler unit 908 and dispatched to a general processing cluster 1000 by the work distribution unit 910. The general processing cluster 1000 is configured to process the task and generate results. The results may be consumed by other tasks within the general processing cluster 1000, routed to a different general processing cluster 1000 via the crossbar 914, or stored in the memory 912. The results can be written to the memory 912 via the memory partition unit 1100 modules, which implement a memory interface for reading and writing data to/from the memory 912. The results can be transmitted to another parallel processing unit 920 or CPU via the NVLink 916. In an embodiment, the parallel processing unit 920 includes a number U of memory partition unit 1100 modules that is equal to the number of separate and distinct memory 912 devices coupled to the parallel processing unit 920. A memory partition unit 1100 will be described in more detail below in conjunction with FIG. 11.

In an embodiment, a host processor executes a driver kernel that implements an application programming interface (API) that enables one or more applications executing on the host processor to schedule operations for execution on the parallel processing unit 920. In an embodiment, multiple compute applications are simultaneously executed by the parallel processing unit 920 and the parallel processing unit 920 provides isolation, quality of service (QoS), and independent address spaces for the multiple compute applications. An application may generate instructions (e.g., API calls) that cause the driver kernel to generate one or more tasks for execution by the parallel processing unit 920. The driver kernel outputs tasks to one or more streams being processed by the parallel processing unit 920. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 12.

Figure 10:
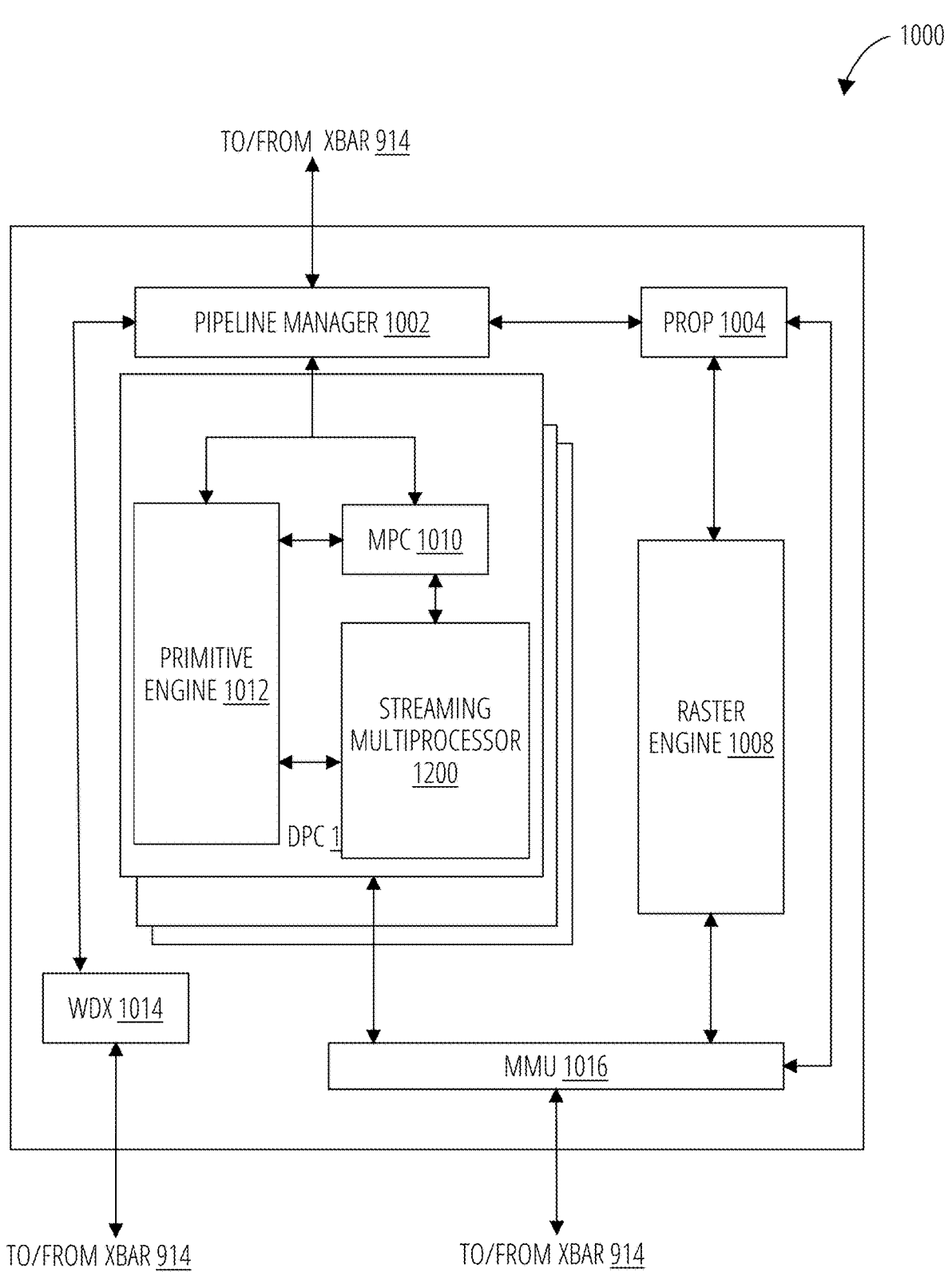
FIG. 10 depicts a general processing cluster 1000 in accordance with one embodiment.

FIG. 10 depicts a general processing cluster 1000 of the parallel processing unit 920 of FIG. 9, in accordance with an embodiment. As shown in FIG. 10, each general processing cluster 1000 includes a number of hardware units for processing tasks. In an embodiment, each general processing cluster 1000 includes a pipeline manager 1002, a pre-raster operations unit 1004, a raster engine 1008, a work distribution crossbar 1014, a memory management unit 1016, and one or more data processing cluster 1006. It will be appreciated that the general processing cluster 1000 of FIG. 10 may include other hardware units in lieu of or in addition to the units shown in FIG. 10.

In an embodiment, the operation of the general processing cluster 1000 is controlled by the pipeline manager 1002. The pipeline manager 1002 manages the configuration of the one or more data processing cluster 1006 modules for processing tasks allocated to the general processing cluster 1000. In an embodiment, the pipeline manager 1002 may configure at least one of the one or more data processing cluster 1006 modules to implement at least a portion of a graphics rendering pipeline. For example, a data processing cluster 1006 may be configured to execute a vertex shader program on the programmable streaming multiprocessor 1200. The pipeline manager 1002 may also be configured to route packets received from the work distribution unit 910 to the appropriate logical units within the general processing cluster 1000. For example, some packets may be routed to fixed function hardware units in the pre-raster operations unit 1004 and/or raster engine 1008 while other packets may be routed to the data processing cluster 1006 modules for processing by the primitive engine 1012 or the streaming multiprocessor 1200. In an embodiment, the pipeline manager 1002 may configure at least one of the one or more data processing cluster 1006 modules to implement a neural network model and/or a computing pipeline.

Figure 11:
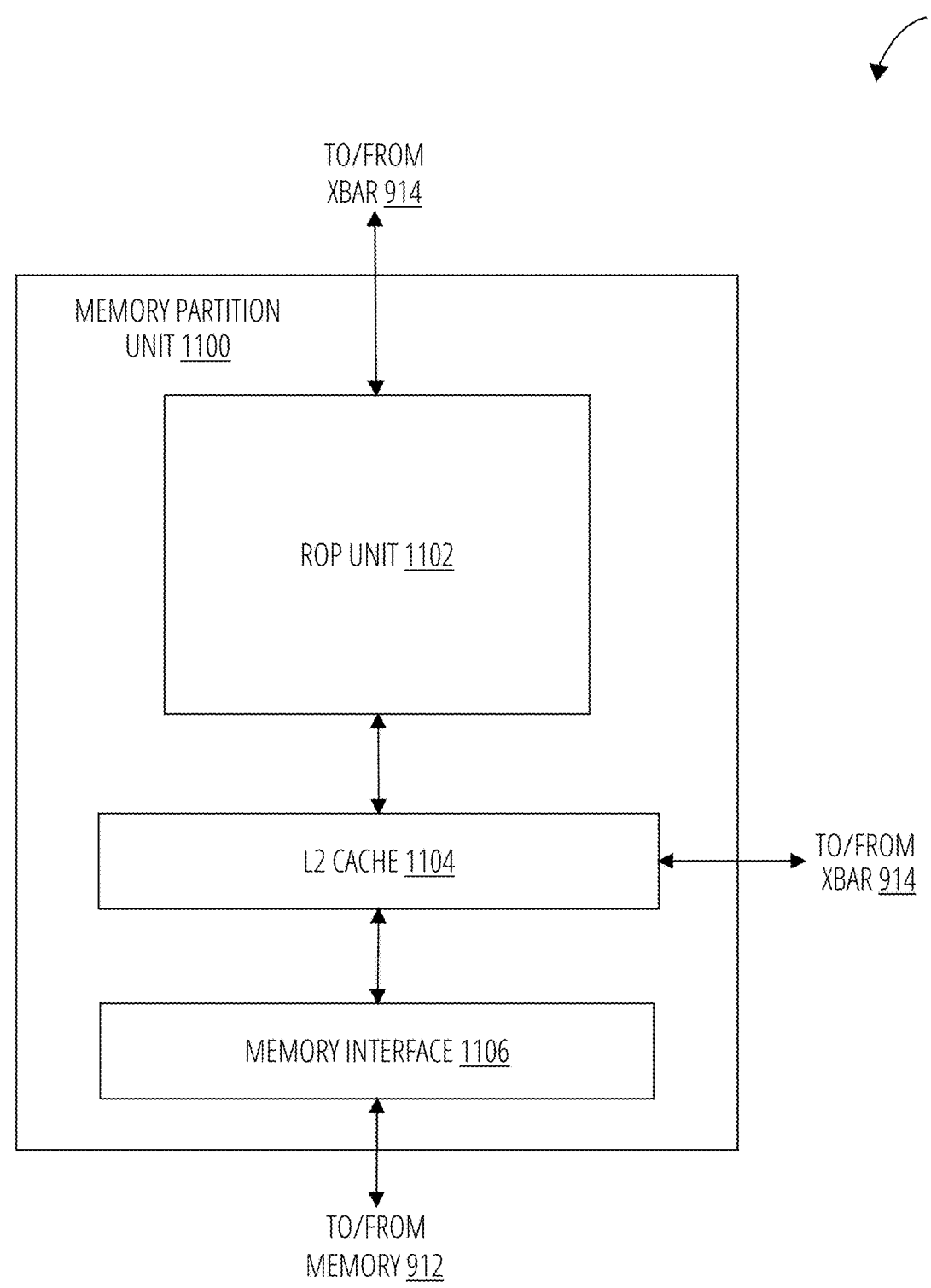
FIG. 11 depicts a memory partition unit 1100 in accordance with one embodiment.

The pre-raster operations unit 1004 is configured to route data generated by the raster engine 1008 and the data processing cluster 1006 modules to a Raster Operations (ROP) unit, described in more detail in conjunction with FIG. 11. The pre-raster operations unit 1004 may also be configured to perform optimizations for color blending, organize pixel data, perform address translations, and the like.

The raster engine 1008 includes a number of fixed function hardware units configured to perform various raster operations. In an embodiment, the raster engine 1008 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1008 comprises fragments to be processed, for example, by a fragment shader implemented within a data processing cluster 1006.

Each data processing cluster 1006 included in the general processing cluster 1000 includes an M-pipe controller 1010, a primitive engine 1012, and one or more streaming multiprocessor 1200 modules. The M-pipe controller 1010 controls the operation of the data processing cluster 1006, routing packets received from the pipeline manager 1002 to the appropriate units in the data processing cluster 1006. For example, packets associated with a vertex may be routed to the primitive engine 1012, which is configured to fetch vertex attributes associated with the vertex from the memory 912. In contrast, packets associated with a shader program may be transmitted to the streaming multiprocessor 1200.

The streaming multiprocessor 1200 comprises a programmable streaming processor that is configured to process tasks represented by a number of threads. Each streaming multiprocessor 1200 is multi-threaded and configured to execute a plurality of threads (e.g., 32 threads) from a particular group of threads concurrently. In an embodiment, the streaming multiprocessor 1200 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1200 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1200 will be described in more detail below in conjunction with FIG. 12.

The memory management unit 1016 provides an interface between the general processing cluster 1000 and the memory partition unit 1100. The memory management unit 1016 may provide translation of virtual addresses into physical addresses, memory protection, and arbitration of memory requests. In an embodiment, the memory management unit 1016 provides one or more translation lookaside buffers (TLBs) for performing translation of virtual addresses into physical addresses in the memory 912.

To enable energy efficient encoding for READ requests, the system first needs to detect the gap between memory (e.g., DRAM) requests, then must encode the requested data with a sparse code of appropriate code length. Upon receiving data, the GPU needs to identify the expected length of the code and decode it with the appropriate decoder.

In one embodiment, the memory controller/memory management unit 1016 anticipate gaps between read commands and specifies different read command types based on the encoding to be used. However, configuring these units to signal and recognize different types of READ and WRITE commands may add undesirable complexity to the system.

There is typically a latency (delay) between the time of issuing READ/WRITE requests to memory and the time the requested data is returned (or sent, in the case of WRITES). In systems where the READ latency (RL) and the WRITE latency are much larger (e.g., >=2X) than the gap intervals, determining the gap at the time of receiving the next READ/WRITE request is early enough to encode the first response without any performance penalty.

After a READ request is sent, both of the memory management unit 1016 and the memory that is the target of the READ command (e.g., in its interface/control logic), may reset counters that count the number of cycles until the next READ or WRITE command is sent and/or received. As data from each READ command is returned after a number of cycles from the memory array to the memory I/O interface, a permitted number of cycles that may be used to transmit that data may be tracked. If the number of such cycles between READ commands enables a sparse code to be inserted on the data bus, then the data to return is encoded by the memory I/O logic with a sparse code (or one of many codes, such that the longest code less than or equal to the target number of transmission cycles is used). The memory management unit 1016, based on its own tracking of the gap lengths, accumulates data over the number of cycles required for the sparse code that it determines the memory I/O logic will select, and decodes that data with the appropriate decoder. A benefit of this mechanism is that it does not require any extra commands or extra pins.

In one embodiment (referred to herein as "conservative gap detection"), the memory interface logic tracks receipt of a WRITE command, and also tracks whether a pre-configured number of bus cycles have elapsed without receiving a READ or a WRITE command. It responds to these events in the same manner it would respond if another READ command was received with no gap. Responding in this fashion prevents a sparse encoding of READ data from causing a delay of the time when WRITE data may be sent on the bus and the commensurate latency that would entail.

In an alternative embodiment (referred to herein as "exhaustive gap detection"), the system may be configured such that WRITE commands are sent with a bus cycle offset relative to the data to write. This equalizes the WRITE latency and READ latency in the system. Therefore any detected bus gap may be exploited for sparse encoding without the possibility of incurring an additional delay in the timing of sending the WRITE data.

For WRITE commands sent from the processor, both the memory management unit 1016 and the memory interface logic may count a number of bus cycles until a next WRITE or READ command is sent or received. The data to accompany each WRITE command may be sent by the processor a pre-configured number of bus cycles after the WRITE command itself. This enables a permitted number of bus cycles available to transmit the WRITE data to be tracked. If a number of bus cycles between WRITE commands permits the use of a sparse code, the processor may encode the data as a sparse code (selected from one of multiple possible sparse codes, such that a longest sparse code less than or equal to the available number of bus cycles is used). The memory interface logic, based on its own tracking of the bus gap lengths between WRITE commands, may accumulate data over the number of cycles utilized by the selected sparse code that it determines the processor will send. The memory interface logic may then select the appropriate decoder to decode the WRITE data.

In systems in which the READ latency is always equal or longer than the WRITE latency, detection of a READ command following a WRITE command may always indicate the presence of a suitable gap length for sparse encoding.

After propagating data read from the memory to the serial line drivers, the system may encode the data to an appropriate MTA or sparse code based on the detected gap (if any), which takes some amount of time. However, in systems where the dominant (most prevalent) gap on the data bus is one clock interval, using a single efficient sparse encoding scheme suitable one clock gap to all gaps (regardless of size) may provide most of benefits from using a more sophisticated dynamic encoding scheme. In one embodiment this single encoding scheme is a 4-bit to 3-symbol (each with three levels) scheme, such as the one depicted in FIG. 5D.

In one embodiment, the system applies MTA for gapless requests and sparse encoding for consecutive requests with idle intervals. The previously described 4-bit to 3-symbol (3-level) encoding (FIG. 5D) is low latency, with a computational time comparable to that for MTA.

When issuing consecutive READ/WRITE requests, the system (e.g., a GPU) may track the cycle counts between the sequence of READ/WRITE requests. The gaps between READ requests enable the GPU to anticipate the encoding format the encoder will use to return data from memory. The GPU decodes the received data either with the appropriate MTA decoder or with a sparse decoder. Because the MTA decoder has a comparable computation time to the spare decoder, there may be no additional bandwidth and latency penalty incurred.

In one embodiment, the sparse encoding is initiated after receiving all data stretched over idle periods in the baseline. In other words, the start time of sparse decoding is postponed as many cycles as the extended amount. When the burst is extended only one extra cycle, the performance penalty may be small. WRITE data is handled similarly, with the GPU encoding write data based on the gaps, and the system decoding the data based on the gaps between the write commands.

The system may select the code that best fits the idle period in data bus. This may be referred to as variable code specification. This multi-modal encoding approach may conserve more energy at the expense of implementing more circuit area for multiple encoders and decoders. It may also possibly consume additional energy when detecting idle periods and translating data.

An alternative approach is supporting only one dominant sparse encoding, which utilizes a simpler detection mechanism to determine that the idle period satisfies a condition for the predefined sparse encoding scheme. This may be referred to as static code specification. Static code specification does not avail of as many potential energy reduction opportunities as variable code specification, but may be implemented with less circuit area overheads and less logic complexity.

Another choice of implementation is the point at which the idle detection scheme makes a decision that a gap is detected. One solution is tracking all consecutive READ/WRITE requests, then determining the gap. Unfortunately, this scheme may not work in some cases. For example, in a scenario where there is a huge gap between two consecutive READ requests, the memory needs to transfer the data for first request even before receiving the second request. Therefore, to leverage all possible idle periods, a counter-based mechanism may be necessary to track all four READ and WRITE combinations. This may be referred to as exhaustive gap detection. An alternative approach is conservative gap detection that tracks the consecutive requests only for some clocks after received a request. If another request arrives at the memory within some predefined detection period, it leverages the idle period for energy reduction. If no other request arrives, it conservatively assumes there is no gap in current requests.

This conservative case is called for because of the latency difference between READ and WRITE. After receiving a READ request, the system does not know whether the next request is READ or WRITE. Therefore, it postpones its decision of whether there is idle period until the expected time of issuing WRITE request. This is entirely feasible to implement and is the mechanism utilized by the exhaustive gap detection scheme. However, conservatively ignoring a gap after the detection period is a simple and effective solution. Combining variable/static code specification and exhaustive/conservative gap detection, there exists four approaches in sparse encoding integration, the choice of which will depend on the constraints of the particular implementation.

FIG. 11 depicts a memory partition unit 1100 of the parallel processing unit 920 of FIG. 9, in accordance with an embodiment. As shown in FIG. 11, the memory partition unit 1100 includes a raster operations unit 1102, a level two cache 1104, and a memory interface 1106. The memory interface 1106 is coupled to the memory 912. Memory interface 1106 may implement 32, 64, 128, 1024-bit data buses, or the like, for high-speed data transfer. In an embodiment, the parallel processing unit 920 incorporates U memory interface 1106 modules, one memory interface 1106 per pair of memory partition unit 1100 modules, where each pair of memory partition unit 1100 modules is connected to a corresponding memory 912 device. For example, parallel processing unit 920 may be connected to up to Y memory 912 devices, such as high bandwidth memory stacks or graphics double-data-rate, version 5, synchronous dynamic random access memory, or other types of persistent storage.

In an embodiment, the memory interface 1106 implements an HBM2 memory interface and Y equals half U. In an embodiment, the HBM2 memory stacks are located on the same physical package as the parallel processing unit 920, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 912 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 920 modules process very large datasets and/or run applications for extended periods.

In an embodiment, the parallel processing unit 920 implements a multi-level memory hierarchy. In an embodiment, the memory partition unit 1100 supports a unified memory to provide a single unified virtual address space for CPU and parallel processing unit 920 memory, enabling data sharing between virtual memory systems. In an embodiment the frequency of accesses by a parallel processing unit 920 to memory located on other processors is traced to ensure that memory pages are moved to the physical memory of the parallel processing unit 920 that is accessing the pages more frequently. In an embodiment, the NVLink 916 supports address translation services allowing the parallel processing unit 920 to directly access a CPU's page tables and providing full access to CPU memory by the parallel processing unit 920.

In an embodiment, copy engines transfer data between multiple parallel processing unit 920 modules or between parallel processing unit 920 modules and CPUs. The copy engines can generate page faults for addresses that are not mapped into the page tables. The memory partition unit 1100 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 912 or other system memory may be fetched by the memory partition unit 1100 and stored in the level two cache 1104, which is located on-chip and is shared between the various general processing cluster 1000 modules. As shown, each memory partition unit 1100 includes a portion of the level two cache 1104 associated with a corresponding memory 912 device. Lower level caches may then be implemented in various units within the general processing cluster 1000 modules. For example, each of the streaming multiprocessor 1200 modules may implement an L1 cache. The L1 cache is private memory that is dedicated to a particular streaming multiprocessor 1200. Data from the level two cache 1104 may be fetched and stored in each of the L1 caches for processing in the functional units of the streaming multiprocessor 1200 modules. The level two cache 1104 is coupled to the memory interface 1106 and the crossbar 914.

The raster operations unit 1102 performs graphics raster operations related to pixel color, such as color compression, pixel blending, and the like. The raster operations unit 1102 also implements depth testing in conjunction with the raster engine 1008, receiving a depth for a sample location associated with a pixel fragment from the culling engine of the raster engine 1008. The depth is tested against a corresponding depth in a depth buffer for a sample location associated with the fragment. If the fragment passes the depth test for the sample location, then the raster operations unit 1102 updates the depth buffer and transmits a result of the depth test to the raster engine 1008. It will be appreciated that the number of partition memory partition unit 1100 modules may be different than the number of general processing cluster 1000 modules and, therefore, each raster operations unit 1102 may be coupled to each of the general processing cluster 1000 modules. The raster operations unit 1102 tracks packets received from the different general processing cluster 1000 modules and determines which general processing cluster 1000 that a result generated by the raster operations unit 1102 is routed to through the crossbar 914. Although the raster operations unit 1102 is included within the memory partition unit 1100 in FIG. 11, in other embodiment, the raster operations unit 1102 may be outside of the memory partition unit 1100. For example, the raster operations unit 1102 may reside in the general processing cluster 1000 or another unit.

Figure 12:
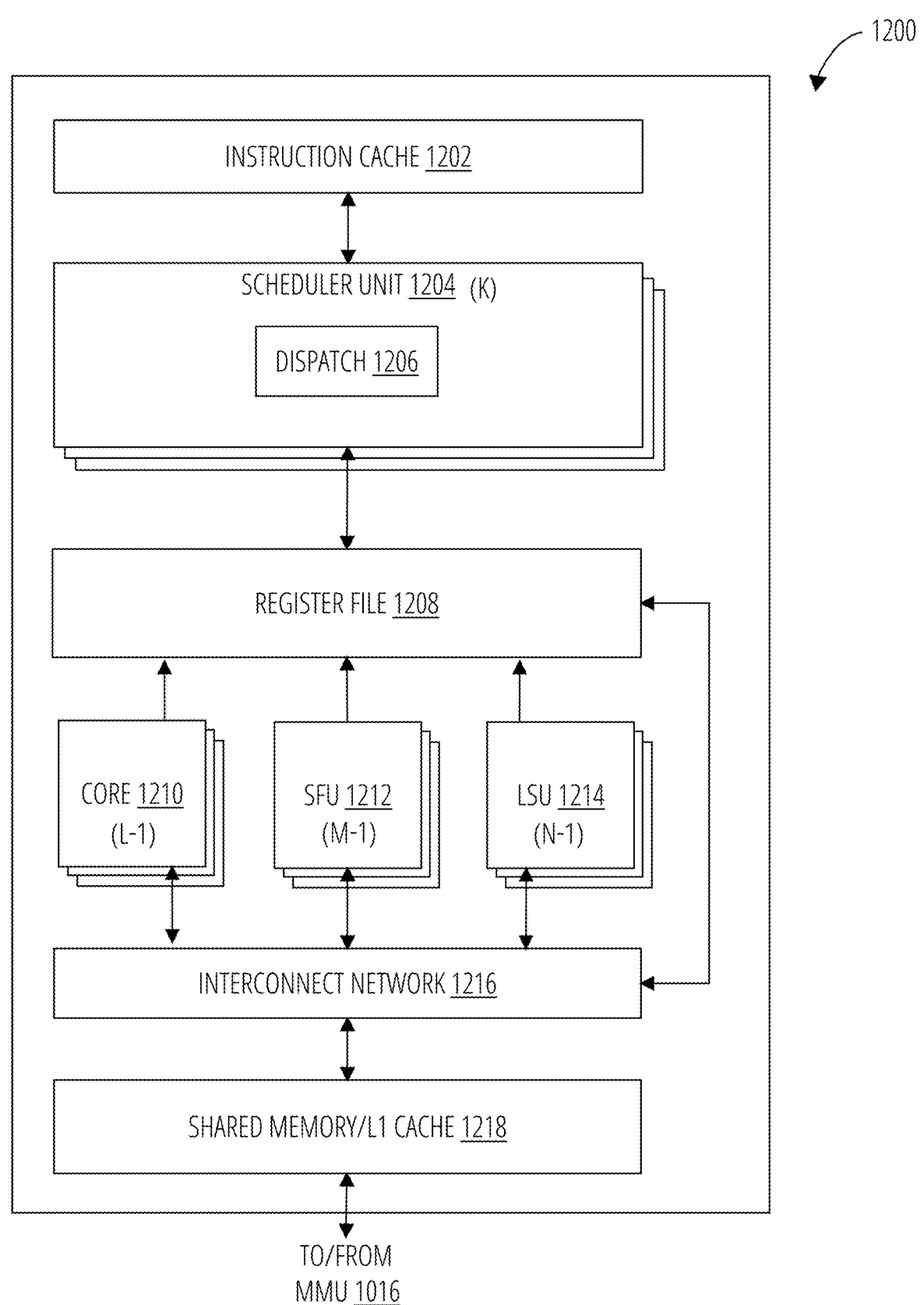
FIG. 12 depicts a streaming multiprocessor 1200 in accordance with one embodiment.

FIG. 12 illustrates the streaming multiprocessor 1200 of FIG. 10, in accordance with an embodiment. As shown in FIG. 12, the streaming multiprocessor 1200 includes an instruction cache 1202, one or more scheduler unit 1204 modules (e.g., such as scheduler unit 908), a register file 1208, one or more processing core 1210 modules, one or more special function unit 1212 modules, one or more load/store unit 1214 modules, an interconnect network 1216, and a shared memory/L1 cache 1218.

As described above, the work distribution unit 910 dispatches tasks for execution on the general processing cluster 1000 modules of the parallel processing unit 920. The tasks are allocated to a particular data processing cluster 1006 within a general processing cluster 1000 and, if the task is associated with a shader program, the task may be allocated to a streaming multiprocessor 1200. The scheduler unit 908 receives the tasks from the work distribution unit 910 and manages instruction scheduling for one or more thread blocks assigned to the streaming multiprocessor 1200. The scheduler unit 1204 schedules thread blocks for execution as warps of parallel threads, where each thread block is allocated at least one warp. In an embodiment, each warp executes 32 threads. The scheduler unit 1204 may manage a plurality of different thread blocks, allocating the warps to the different thread blocks and then dispatching instructions from the plurality of different cooperative groups to the various functional units (e.g., core 1210 modules, special function unit 1212 modules, and load/store unit 1214 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1206 unit is configured within the scheduler unit 1204 to transmit instructions to one or more of the functional units. In one embodiment, the scheduler unit 1204 includes two dispatch 1206 units that enable two different instructions from the same warp to be dispatched during each clock cycle. In alternative embodiments, each scheduler unit 1204 may include a single dispatch 1206 unit or additional dispatch 1206 units.

Each streaming multiprocessor 1200 includes a register file 1208 that provides a set of registers for the functional units of the streaming multiprocessor 1200. In an embodiment, the register file 1208 is divided between each of the functional units such that each functional unit is allocated a dedicated portion of the register file 1208. In another embodiment, the register file 1208 is divided between the different warps being executed by the streaming multiprocessor 1200. The register file 1208 provides temporary storage for operands connected to the data paths of the functional units.

Each streaming multiprocessor 1200 comprises L processing core 1210 modules. In an embodiment, the streaming multiprocessor 1200 includes a large number (e.g., 128, etc.) of distinct processing core 1210 modules. Each core 1210 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1210 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1210 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1200 also comprises M special function unit 1212 modules that perform special functions (e.g., attribute evaluation, reciprocal square root, and the like). In an embodiment, the special function unit 1212 modules may include a tree traversal unit configured to traverse a hierarchical tree data structure. In an embodiment, the special function unit 1212 modules may include texture unit configured to perform texture map filtering operations. In an embodiment, the texture units are configured to load texture maps (e.g., a 2D array of texels) from the memory 912 and sample the texture maps to produce sampled texture values for use in shader programs executed by the streaming multiprocessor 1200. In an embodiment, the texture maps are stored in the shared memory/L1 cache 1218. The texture units implement texture operations such as filtering operations using mip-maps (e.g., texture maps of varying levels of detail). In an embodiment, each streaming multiprocessor 1200 includes two texture units.

Each streaming multiprocessor 1200 also comprises N load/store unit 1214 modules that implement load and store operations between the shared memory/L1 cache 1218 and the register file 1208. Each streaming multiprocessor 1200 includes an interconnect network 1216 that connects each of the functional units to the register file 1208 and the load/store unit 1214 to the register file 1208 and shared memory/L1 cache 1218. In an embodiment, the interconnect network 1216 is a crossbar that can be configured to connect any of the functional units to any of the registers in the register file 1208 and connect the load/store unit 1214 modules to the register file 1208 and memory locations in shared memory/L1 cache 1218.

The shared memory/L1 cache 1218 is an array of on-chip memory that allows for data storage and communication between the streaming multiprocessor 1200 and the primitive engine 1012 and between threads in the streaming multiprocessor 1200. In an embodiment, the shared memory/L1 cache 1218 comprises 128 KB of storage capacity and is in the path from the streaming multiprocessor 1200 to the memory partition unit 1100. The shared memory/L1 cache 1218 can be used to cache reads and writes. One or more of the shared memory/L1 cache 1218, level two cache 1104, and memory 912 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1218 enables the shared memory/L1 cache 1218 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 9, are bypassed, creating a much simpler programming model. In the general purpose parallel computation configuration, the work distribution unit 910 assigns and distributes blocks of threads directly to the data processing cluster 1006 modules. The threads in a block execute the same program, using a unique thread ID in the calculation to ensure each thread generates unique results, using the streaming multiprocessor 1200 to execute the program and perform calculations, shared memory/L1 cache 1218 to communicate between threads, and the load/store unit 1214 to read and write global memory through the shared memory/L1 cache 1218 and the memory partition unit 1100. When configured for general purpose parallel computation, the streaming multiprocessor 1200 can also write commands that the scheduler unit 908 can use to launch new work on the data processing cluster 1006 modules.

The parallel processing unit 920 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 920 is embodied on a single semiconductor substrate. In another embodiment, the parallel processing unit 920 is included in a system-on-a-chip (SoC) along with one or more other devices such as additional parallel processing unit 920 modules, the memory 912, a reduced instruction set computer (RISC) CPU, a memory management unit (MMU), a digital-to-analog converter (DAC), and the like.

In an embodiment, the parallel processing unit 920 may be included on a graphics card that includes one or more memory devices. The graphics card may be configured to interface with a PCIe slot on a motherboard of a desktop computer. In yet another embodiment, the parallel processing unit 920 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 13:
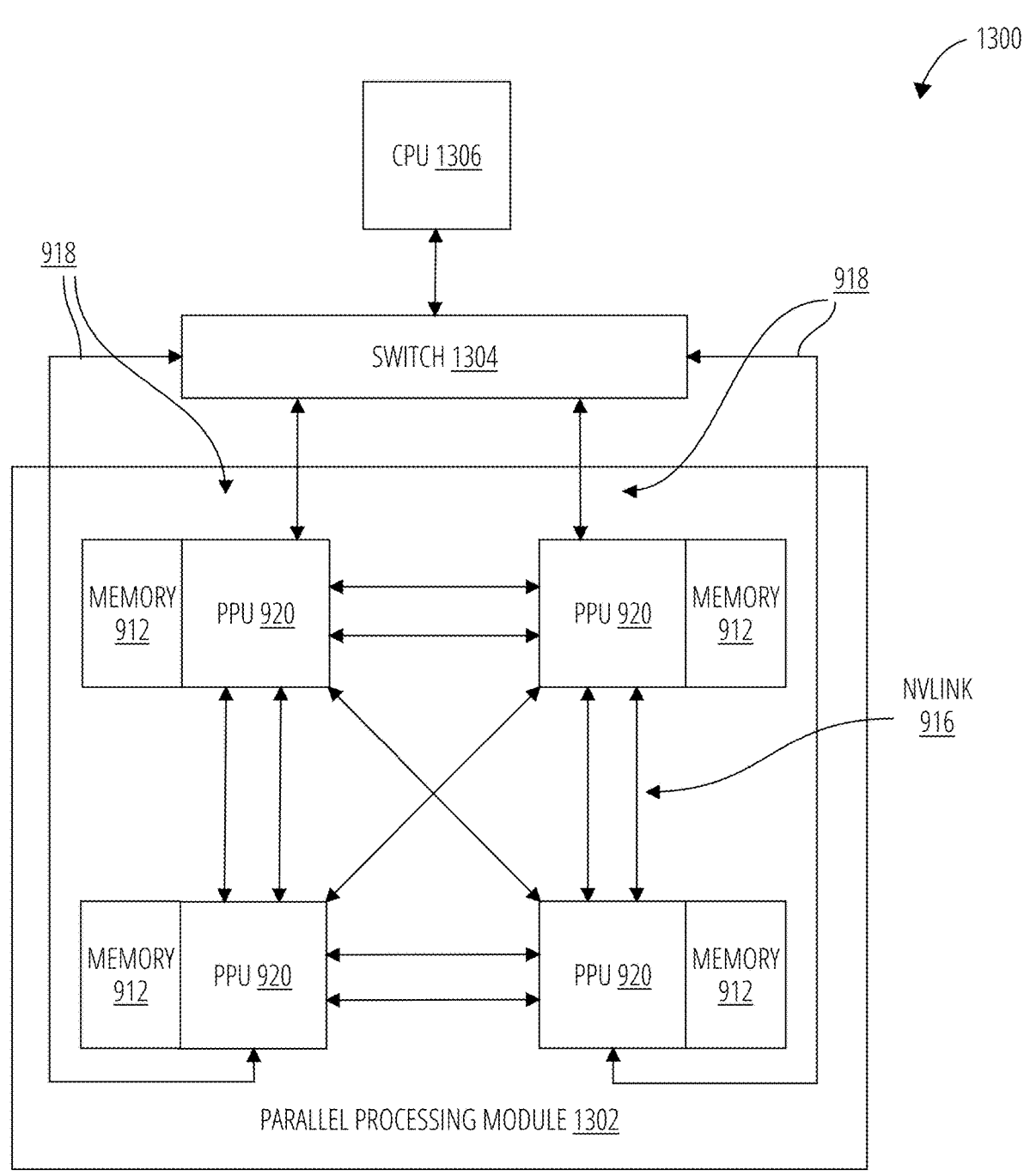
FIG. 13 depicts a processing system 1300 in accordance with one embodiment.

FIG. 13 is a conceptual diagram of a processing system 1300 implemented using the parallel processing unit 920 of FIG. 9, in accordance with an embodiment. The processing system 1300 includes a central processing unit 1306, switch 1304, and multiple parallel processing unit 920 modules each and respective memory 912 modules. The NVLink 916 provides high-speed communication links between each of the parallel processing unit 920 modules. Although a particular number of NVLink 916 and interconnect 918 connections are illustrated in FIG. 13, the number of connections to each parallel processing unit 920 and the central processing unit 1306 may vary. The switch 1304 interfaces between the interconnect 918 and the central processing unit 1306. The parallel processing unit 920 modules, memory 912 modules, and NVLink 916 connections may be situated on a single semiconductor platform to form a parallel processing module 1302. In an embodiment, the switch 1304 supports two or more protocols to interface between various different connections and/or links.

In another embodiment (not shown), the NVLink 916 provides one or more high-speed communication links between each of the parallel processing unit modules (parallel processing unit 920, parallel processing unit 920, parallel processing unit 920, and parallel processing unit 920) and the central processing unit 1306 and the switch 1304 interfaces between the interconnect 918 and each of the parallel processing unit modules. The parallel processing unit modules, memory 912 modules, and interconnect 918 may be situated on a single semiconductor platform to form a parallel processing module 1302. In yet another embodiment (not shown), the interconnect 918 provides one or more communication links between each of the parallel processing unit modules and the central processing unit 1306 and the switch 1304 interfaces between each of the parallel processing unit modules using the NVLink 916 to provide one or more high-speed communication links between the parallel processing unit modules. In another embodiment (not shown), the NVLink 916 provides one or more high-speed communication links between the parallel processing unit modules and the central processing unit 1306 through the switch 1304. In yet another embodiment (not shown), the interconnect 918 provides one or more communication links between each of the parallel processing unit modules directly. One or more of the NVLink 916 high-speed communication links may be implemented as a physical NVLink interconnect or either an on-chip or on-die interconnect using the same protocol as the NVLink 916.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1302 may be implemented as a circuit board substrate and each of the parallel processing unit modules and/or memory 912 modules may be packaged devices. In an embodiment, the central processing unit 1306, switch 1304, and the parallel processing module 1302 are situated on a single semiconductor platform.

In an embodiment, the signaling rate of each NVLink 916 is 20 to 25 Gigabits/second and each parallel processing unit module includes six NVLink 916 interfaces (as shown in FIG. 13, five NVLink 916 interfaces are included for each parallel processing unit module). Each NVLink 916 provides a data transfer rate of 25 Gigabytes/second in each direction, with six links providing 300 Gigabytes/second. The NVLink 916 can be used exclusively for PPU-to-PPU communication as shown in FIG. 13, or some combination of PPU-to-PPU and PPU-to-CPU, when the central processing unit 1306 also includes one or more NVLink 916 interfaces.

In an embodiment, the NVLink 916 allows direct load/store/atomic access from the central processing unit 1306 to each parallel processing unit module's memory 912. In an embodiment, the NVLink 916 supports coherency operations, allowing data read from the memory 912 modules to be stored in the cache hierarchy of the central processing unit 1306, reducing cache access latency for the central processing unit 1306. In an embodiment, the NVLink 916 includes support for Address Translation Services (ATS), enabling the parallel processing unit module to directly access page tables within the central processing unit 1306. One or more of the NVLink 916 may also be configured to operate in a low-power mode.

Figure 14:
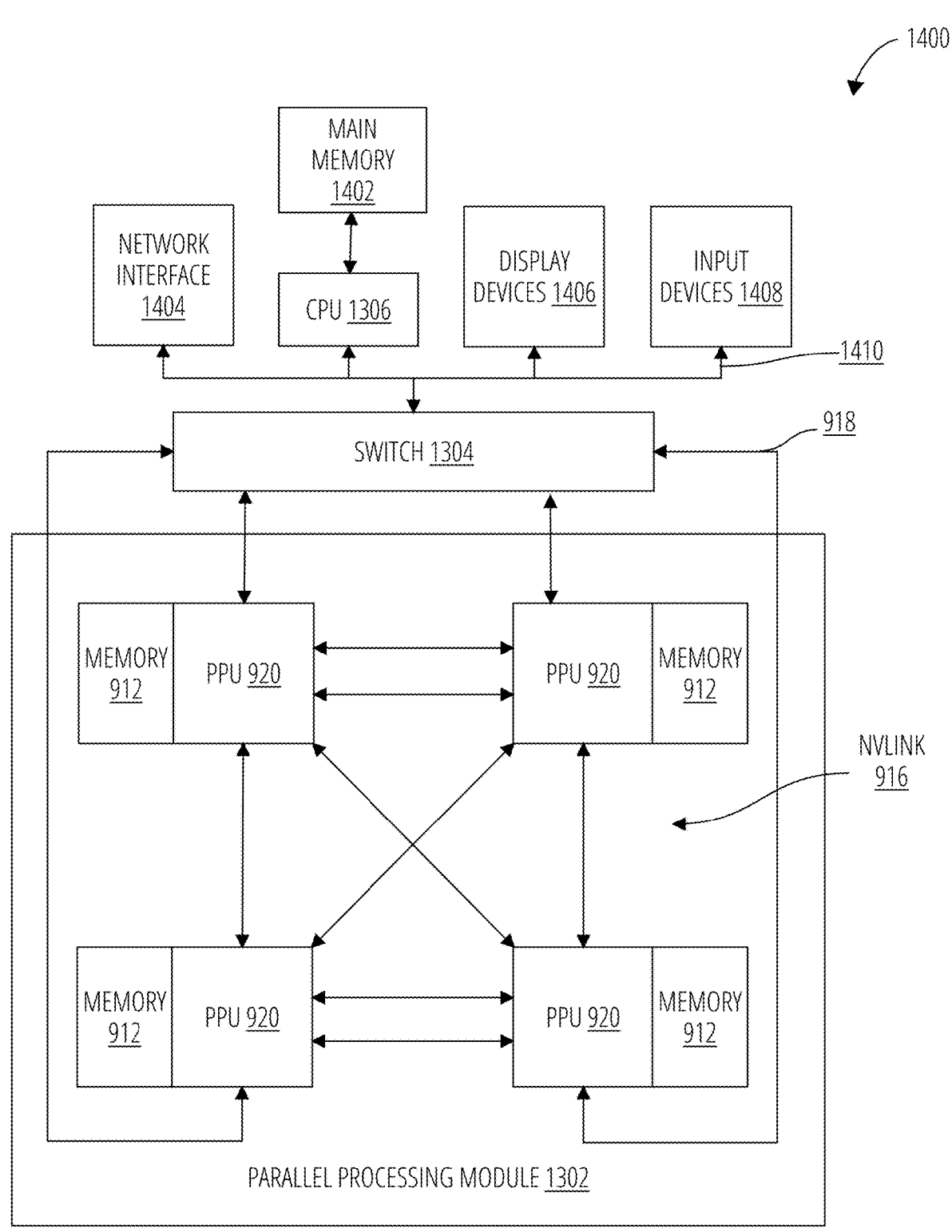
FIG. 14 depicts an exemplary processing system 1400 in accordance with another embodiment.

FIG. 14 depicts an exemplary processing system 1400 in which the various architecture and/or functionality of the various previous embodiments may be implemented. As shown, an exemplary processing system 1400 is provided including at least one central processing unit 1306 that is connected to a communications bus 1410. The communication communications bus 1410 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1400 also includes a main memory 1402. Control logic (software) and data are stored in the main memory 1402 which may take the form of random access memory (RAM).

The exemplary processing system 1400 also includes input devices 1408, the parallel processing module 1302, and display devices 1406, e.g. a conventional CRT (cathode ray tube), LCD (liquid crystal display), LED (light emitting diode), plasma display or the like. User input may be received from the input devices 1408, e.g., keyboard, mouse, touchpad, microphone, and the like. Each of the foregoing modules and/or devices may even be situated on a single semiconductor platform to form the exemplary processing system 1400. Alternately, the various modules may also be situated separately or in various combinations of semiconductor platforms per the desires of the user.

Further, the exemplary processing system 1400 may be coupled to a network (e.g., a telecommunications network, local area network (LAN), wireless network, wide area network (WAN) such as the Internet, peer-to-peer network, cable network, or the like) through a network interface 1404 for communication purposes.

The exemplary processing system 1400 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1402 and/or the secondary storage. Such computer programs, when executed, enable the exemplary processing system 1400 to perform various functions. The main memory 1402, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1400 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

Figure 15:
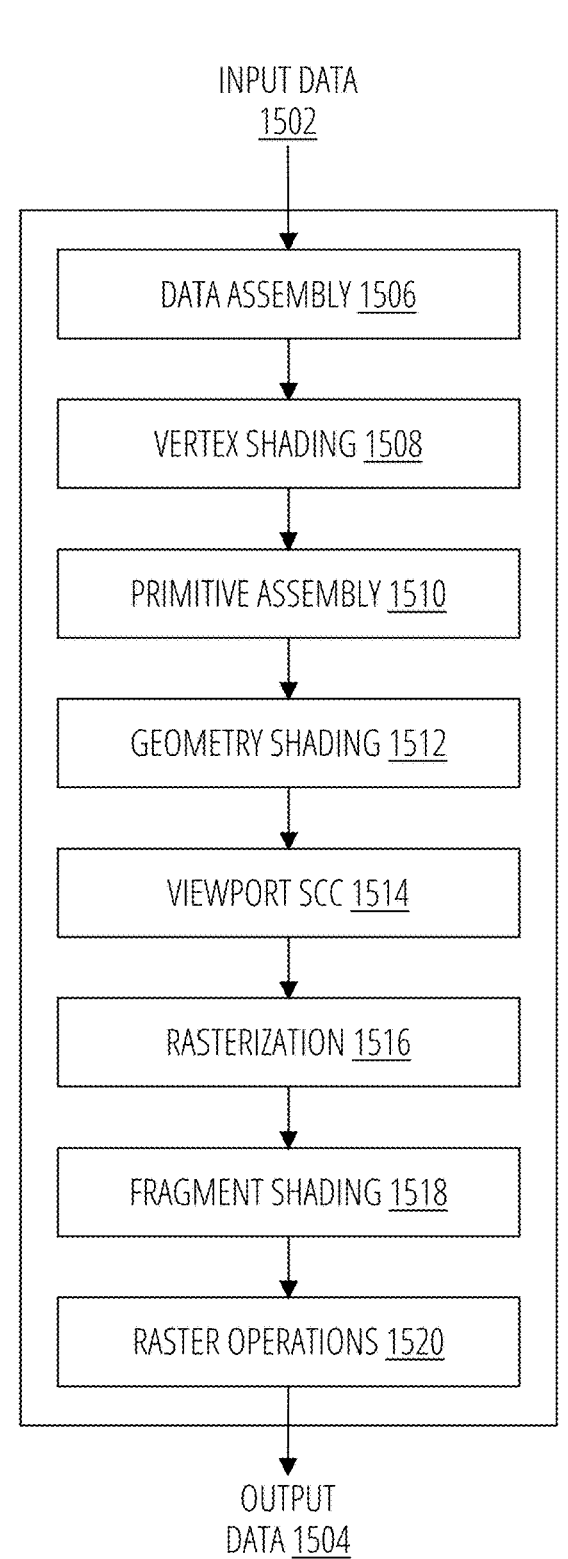
FIG. 15 depicts a graphics processing pipeline 1500 in accordance with one embodiment.

FIG. 15 is a conceptual diagram of a graphics processing pipeline 1500 implemented by the parallel processing unit 920 of FIG. 9, in accordance with an embodiment. In an embodiment, the parallel processing unit 920 comprises a graphics processing unit (GPU). The parallel processing unit 920 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 920 can be configured to process the graphics primitives to generate a frame buffer (e.g., pixel data for each of the pixels of the display).

An application writes model data for a scene (e.g., a collection of vertices and attributes) to a memory such as a system memory or memory 912. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1200 modules of the parallel processing unit 920 including one or more of a vertex shader, hull shader, domain shader, geometry shader, and a pixel shader. For example, one or more of the streaming multiprocessor 1200 modules may be configured to execute a vertex shader program that processes a number of vertices defined by the model data. In an embodiment, the different streaming multiprocessor 1200 modules may be configured to execute different shader programs concurrently. For example, a first subset of streaming multiprocessor 1200 modules may be configured to execute a vertex shader program while a second subset of streaming multiprocessor 1200 modules may be configured to execute a pixel shader program. The first subset of streaming multiprocessor 1200 modules processes vertex data to produce processed vertex data and writes the processed vertex data to the level two cache 1104 and/or the memory 912. After the processed vertex data is rasterized (e.g., transformed from three-dimensional data into two-dimensional data in screen space) to produce fragment data, the second subset of streaming multiprocessor 1200 modules executes a pixel shader to produce processed fragment data, which is then blended with other processed fragment data and written to the frame buffer in memory 912. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1500 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1500 receives input data 601 that is transmitted from one stage to the next stage of the graphics processing pipeline 1500 to generate output data 1504. In an embodiment, the graphics processing pipeline 1500 may represent a graphics processing pipeline defined by the OpenGL® API. As an option, the graphics processing pipeline 1500 may be implemented in the context of the functionality and architecture of the previous Figures and/or any subsequent Figure(s).

As shown in FIG. 15, the graphics processing pipeline 1500 comprises a pipeline architecture that includes a number of stages. The stages include, but are not limited to, a data assembly 1506 stage, a vertex shading 1508 stage, a primitive assembly 1510 stage, a geometry shading 1512 stage, a viewport SCC 1514 stage, a rasterization 1516 stage, a fragment shading 1518 stage, and a raster operations 1520 stage. In an embodiment, the input data 1502 comprises commands that configure the processing units to implement the stages of the graphics processing pipeline 1500 and geometric primitives (e.g., points, lines, triangles, quads, triangle strips or fans, etc.) to be processed by the stages. The output data 1504 may comprise pixel data (e.g., color data) that is copied into a frame buffer or other type of surface data structure in a memory.

The data assembly 1506 stage receives the input data 1502 that specifies vertex data for high-order surfaces, primitives, or the like. The data assembly 1506 stage collects the vertex data in a temporary storage or queue, such as by receiving a command from the host processor that includes a pointer to a buffer in memory and reading the vertex data from the buffer. The vertex data is then transmitted to the vertex shading 1508 stage for processing.

The vertex shading 1508 stage processes vertex data by performing a set of operations (e.g., a vertex shader or a program) once for each of the vertices. Vertices may be, e.g., specified as a 4-coordinate vector (e.g., $<x, y, z, w>$) associated with one or more vertex attributes (e.g., color, texture coordinates, surface normal, etc.). The vertex shading 1508 stage may manipulate individual vertex attributes such as position, color, texture coordinates, and the like. In other words, the vertex shading 1508 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1508 stage generates transformed vertex data that is transmitted to the primitive assembly 1510 stage.

The primitive assembly 1510 stage collects vertices output by the vertex shading 1508 stage and groups the vertices into geometric primitives for processing by the geometry shading 1512 stage. For example, the primitive assembly 1510 stage may be configured to group every three consecutive vertices as a geometric primitive (e.g., a triangle) for transmission to the geometry shading 1512 stage. In some embodiments, specific vertices may be reused for consecutive geometric primitives (e.g., two consecutive triangles in a triangle strip may share two vertices). The primitive assembly 1510 stage transmits geometric primitives (e.g., a collection of associated vertices) to the geometry shading 1512 stage.

The geometry shading 1512 stage processes geometric primitives by performing a set of operations (e.g., a geometry shader or program) on the geometric primitives. Tessellation operations may generate one or more geometric primitives from each geometric primitive. In other words, the geometry shading 1512 stage may subdivide each geometric primitive into a finer mesh of two or more geometric primitives for processing by the rest of the graphics processing pipeline 1500. The geometry shading 1512 stage transmits geometric primitives to the viewport SCC 1514 stage.

In an embodiment, the graphics processing pipeline 1500 may operate within a streaming multiprocessor and the vertex shading 1508 stage, the primitive assembly 1510 stage, the geometry shading 1512 stage, the fragment shading 1518 stage, and/or hardware/software associated therewith, may sequentially perform processing operations. Once the sequential processing operations are complete, in an embodiment, the viewport SCC 1514 stage may utilize the data. In an embodiment, primitive data processed by one or more of the stages in the graphics processing pipeline 1500 may be written to a cache (e.g. L1 cache, a vertex cache, etc.). In this case, in an embodiment, the viewport SCC 1514 stage may access the data in the cache. In an embodiment, the viewport SCC 1514 stage and the rasterization 1516 stage are implemented as fixed function circuitry.

The viewport SCC 1514 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1516 stage.

The rasterization 1516 stage converts the 3D geometric primitives into 2D fragments (e.g. capable of being utilized for display, etc.). The rasterization 1516 stage may be configured to utilize the vertices of the geometric primitives to setup a set of plane equations from which various attributes can be interpolated. The rasterization 1516 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1516 stage generates fragment data (e.g., interpolated vertex attributes associated with a particular sample location for each covered pixel) that are transmitted to the fragment shading 1518 stage.

The fragment shading 1518 stage processes fragment data by performing a set of operations (e.g., a fragment shader or a program) on each of the fragments. The fragment shading 1518 stage may generate pixel data (e.g., color values) for the fragment such as by performing lighting operations or sampling texture maps using interpolated texture coordinates for the fragment. The fragment shading 1518 stage generates pixel data that is transmitted to the raster operations 1520 stage.

The raster operations 1520 stage may perform various operations on the pixel data such as performing alpha tests, stencil tests, and blending the pixel data with other pixel data corresponding to other fragments associated with the pixel. When the raster operations 1520 stage has finished processing the pixel data (e.g., the output data 1504), the pixel data may be written to a render target such as a frame buffer, a color buffer, or the like.

It will be appreciated that one or more additional stages may be included in the graphics processing pipeline 1500 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1512 stage). Other types of graphics processing pipelines are contemplated as being within the scope of the present disclosure. Furthermore, any of the stages of the graphics processing pipeline 1500 may be implemented by one or more dedicated hardware units within a graphics processor such as parallel processing unit 920. Other stages of the graphics processing pipeline 1500 may be implemented by programmable hardware units such as the streaming multiprocessor 1200 of the parallel processing unit 920.

The graphics processing pipeline 1500 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 920. The API provides an abstraction for a programmer that lets a programmer utilize specialized graphics hardware, such as the parallel processing unit 920, to generate the graphical data without requiring the programmer to utilize the specific instruction set for the parallel processing unit 920. The application may include an API call that is routed to the device driver for the parallel processing unit 920. The device driver interprets the API call and performs various operations to respond to the API call. In some instances, the device driver may perform operations by executing instructions on the CPU. In other instances, the device driver may perform operations, at least in part, by launching operations on the parallel processing unit 920 utilizing an input/output interface between the CPU and the parallel processing unit 920. In an embodiment, the device driver is configured to implement the graphics processing pipeline 1500 utilizing the hardware of the parallel processing unit 920.

Various programs may be executed within the parallel processing unit 920 in order to implement the various stages of the graphics processing pipeline 1500. For example, the device driver may launch a kernel on the parallel processing unit 920 to perform the vertex shading 1508 stage on one streaming multiprocessor 1200 (or multiple streaming multiprocessor 1200 modules). The device driver (or the initial kernel executed by the parallel processing unit 920) may also launch other kernels on the parallel processing unit 920 to perform other stages of the graphics processing pipeline 1500, such as the geometry shading 1512 stage and the fragment shading 1518 stage. In addition, some of the stages of the graphics processing pipeline 1500 may be implemented on fixed unit hardware such as a rasterizer or a data assembler implemented within the parallel processing unit 920. It will be appreciated that results from one kernel may be processed by one or more intervening fixed function hardware units before being processed by a subsequent kernel on a streaming multiprocessor 1200.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C. § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A communication method comprising:
applying a first encoding technique on a bit sequence to generate a plurality of first pulse amplitude modulated (PAM) symbols for data communicated over at least one bus;
detecting a gap in command traffic on the bus; and
in response to detecting the gap in command traffic, switching to a second encoding technique on the bit sequence to generate second PAM symbols for the data on the bus in the gap, the second PAM symbols comprising higher sparsity than the first PAM symbols.

2. The method of claim 1, wherein both of the first encoding technique and the second encoding technique avoid 3-level transitions between symbols on the bus.

3. The method of claim 1, wherein the second PAM symbols are formed to draw less energy from the bus than do the first PAM symbols.

4. The method of claim 1, wherein the second PAM symbols comprise 4b4s31 symbols.

5. The method of claim 1, wherein the second PAM symbols comprise 4b3s31 symbols.

6. The method of claim 1, wherein the second encoding technique is selected based on a size of the gap in command traffic.

7. The method of claim 1, wherein the second encoding technique is 4b3s31 regardless of a size of the gap in command traffic.

8. The method of claim 1, further comprising:
on condition that a first symbol value is not a lowest-energy consumption symbol value, swapping the first symbol value on the bus with a second symbol value of lowest energy consumption; and
encoding an indication of the swap on a data bus inversion (DBI) line of the at least one bus.

9. The method of claim 8, wherein the indication on the DBI line specifies whether L0 was swapped for L1, L2, or neither one.

10. The method of claim 1, further comprising:
on condition that one of the first PAM symbols or one of the second PAM symbols, respectively, is a highest energy consumption symbol, shifting a level of a next symbol to transmit on the bus to a next highest level than the first encoding technique or the second encoding technique, respectively, would have generated otherwise.

11. A transceiver comprising:
a first codebook for a plurality of first PAM symbols;
a second codebook for a second plurality of PAM symbols comprising higher sparsity than the first PAM symbols; and
logic to switch from the first codebook to the second codebook to generate symbols on a data bus, in response to detection of a gap in command traffic, the symbols generated in the gap.

12. The transceiver of claim 11, wherein the second PAM symbols are configured to draw less energy from the data bus than do the first PAM symbols.

13. The transceiver of claim 11, wherein the second PAM symbols comprise 4b4s31 symbols.

14. The transceiver of claim 11, wherein the second PAM symbols comprise 4b3s31 symbols.

15. The transceiver of claim 11, wherein the second codebook is selected based on a size of the gap in command traffic.

16. A system comprising:
a processor;
a memory;
logic to switch from utilizing a first encoding mechanism to utilizing a second encoding mechanism to generate PAM symbols on a memory bus, in response to detection of a gap in access commands from the processor to the memory, the symbols generated in the gap; and
wherein the second encoding mechanism draws less power from the memory bus than the first encoding mechanism.

17. The system of claim 16, wherein the second encoding mechanism is selected based on a size of the gap between the memory access commands.

18. The system of claim 16, wherein both of the first encoding mechanism and the second encoding mechanism implement maximum transition avoidance.

19. The system of claim 16, wherein the second encoding mechanism generates 4b3s31 PAM symbols.

20. The system of claim 16, wherein the processor is a graphics processing unit.

21. A communication method comprising:
applying a first encoding technique on a bit sequence to generate a plurality of first pulse amplitude modulated (PAM) symbols for data communicated over at least one bus;
detecting a gap in command traffic on the bus;
in response to detecting the gap in command traffic, switching to a second encoding technique on the bit sequence to generate second PAM symbols for the data on the bus in the gap, the second PAM symbols comprising higher sparsity than the first PAM symbols; and
on condition that a first symbol value is not a lowest-energy consumption symbol value, swapping the first symbol value on the bus with a second symbol value of lowest energy consumption; and
encoding an indication of the swap on a data bus inversion (DBI) line of the at least one bus.

22. A communication method comprising:
applying a first encoding technique on a bit sequence to generate a plurality of first pulse amplitude modulated (PAM) symbols for data communicated over at least one bus;
detecting a gap in command traffic on the bus;
in response to detecting the gap in command traffic, switching to a second encoding technique on the bit sequence to generate second PAM symbols for the data on the bus in the gap, the second PAM symbols comprising higher sparsity than the first PAM symbols; and
on condition that one of the first PAM symbols or one of the second PAM symbols, respectively, is a highest energy consumption symbol, shifting a level of a next symbol to transmit on the bus to a next highest level than the first encoding technique or the second encoding technique, respectively, would have generated otherwise.

* * * * *